Nov. 10, 1970

J. H. LEMELSON 3,539,715

INFORMATION STORAGE AND REPRODUCTION SYSTEM

Original Filed Feb. 26, 1964

INVENTOR.
Jerome H. Lemelson
BY
Bertram Frank

Nov. 10, 1970  J. H. LEMELSON  3,539,715
INFORMATION STORAGE AND REPRODUCTION SYSTEM
Original Filed Feb. 26, 1964  12 Sheets-Sheet 4

INVENTOR.
Jerome H. Lemelson
BY
Bertram Frank

INVENTOR.
Jerome H. Lemelson
BY

Nov. 10, 1970  J. H. LEMELSON  3,539,715
INFORMATION STORAGE AND REPRODUCTION SYSTEM
Original Filed Feb. 26, 1964  12 Sheets-Sheet 7

INVENTOR.
Jerome H. Lemelson
BY
Bertram Frank

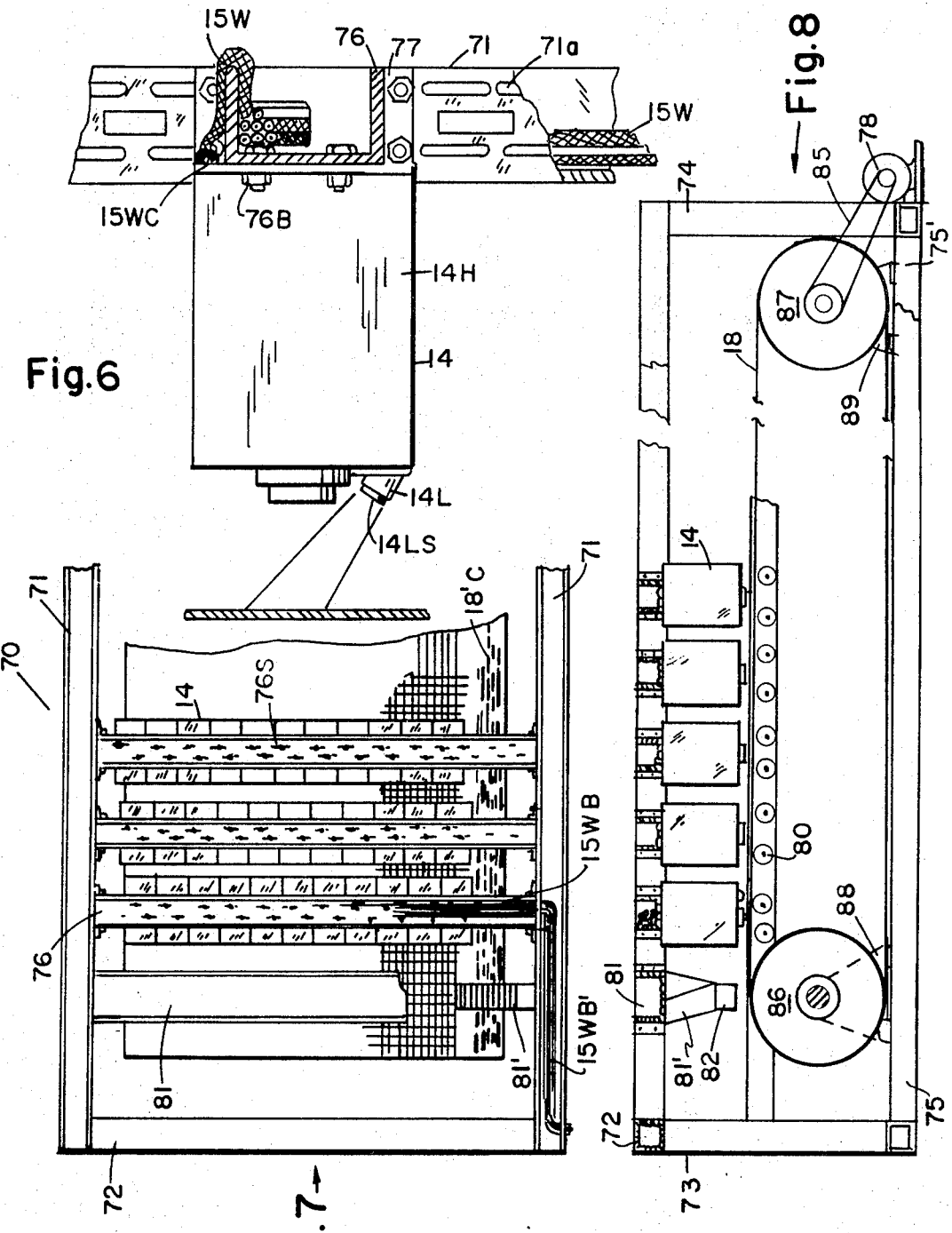

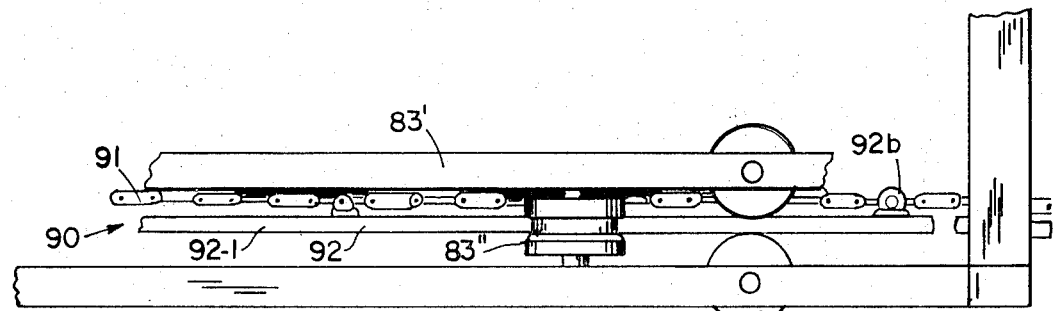
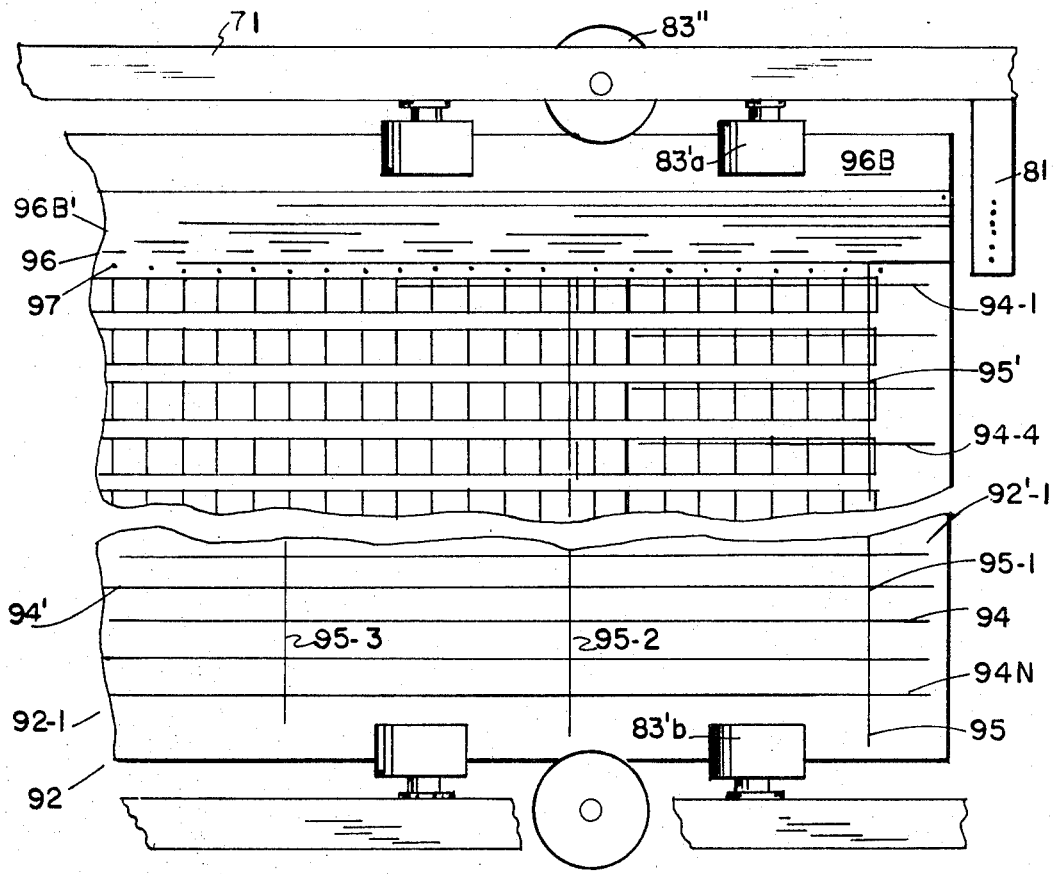

Nov. 10, 1970  J. H. LEMELSON  3,539,715
INFORMATION STORAGE AND REPRODUCTION SYSTEM
Original Filed Feb. 26, 1964  12 Sheets-Sheet 10

INVENTOR.
Jerome H. Lemelson
BY

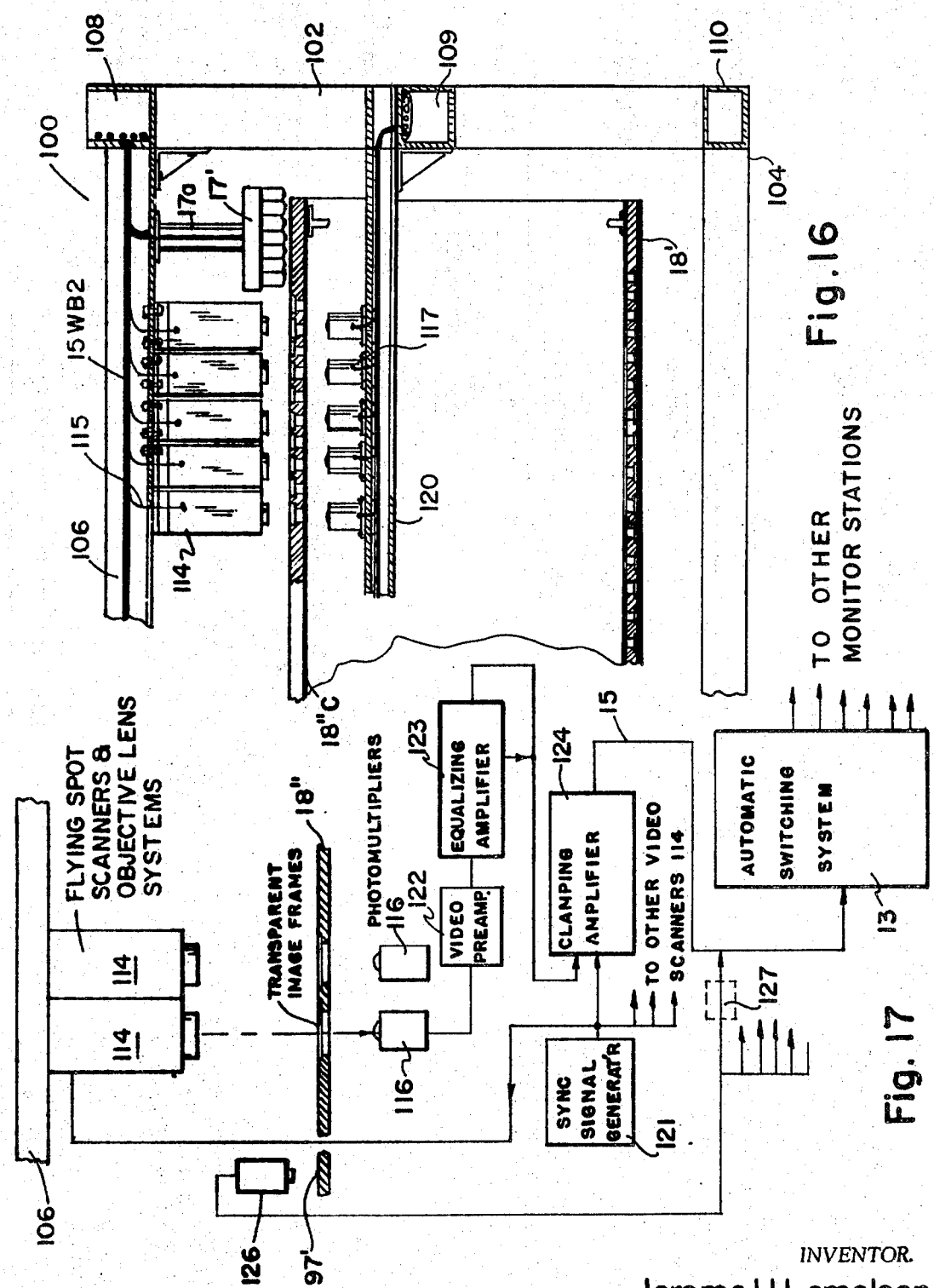

United States Patent Office 3,539,715
Patented Nov. 10, 1970

3,539,715
INFORMATION STORAGE AND REPRODUCTION SYSTEM
Jerome H. Lemelson, 85 Rector St.,
Metuchen, N.J. 08840
Continuation of application Ser. No. 347,999, Feb. 26, 1964. This application Nov. 21, 1968, Ser. No. 781,689
Int. Cl. H04n 5/76, 7/18
U.S. Cl. 178—6            35 Claims

ABSTRACT OF THE DISCLOSURE

An information storage and reproduction apparatus is provided which employs a master information storage system and a plurality of monitor stations each provided with means for deriving selected information from said master storage system as electrical signals generated or communication channels established between said monitor stations and said storage center. Each monitor station includes a receiver-monitor set and means for converting signals received from the master storage system to images on a screen which are capable of being visually monitored and analyzed. Each monitor station includes means for storing information received from the master storage system either in the form of an image storage tube operative to store and present information received directly from the storage system or by means of an intermediate storage system from which information signals may be selectively fed to the monitor screen.

---

This invention relates to information storage apparatus and, in particular, to an information storage system employing a continuously and/or intermittently movable conveyor for image frames and apparatus for selectively reproducing images of said frames.

This application is a continuation of Ser. No. 347,999, filed Feb. 26, 1964 and now abandoned, which was a continuation-in-part of my copending applications Ser. No. 515,417 filed June 14, 1955, now U.S. Pat. No. 3,003,109, Ser. No. 668,348 and filed on June 27, 1957, now U.S. Pat. 3,051,777 and Ser. No. 765,401 filed Oct. 6, 1958 now abandoned for Information Storage and Reproduction System.

Various systems have been employed for the storage and retrieval of information stored in the form of documents, pictures or prints. These have included apparatus employing the micro-filming of printed pages, documents, pictures and the like and the provision of image transparencies on cards which are either manually or automatically selected from storage and scanned by means of an optical projector device.

In the storage and retrieval of very large quantities of image information, such as contained in libraries of said information, in which the number of pages or image frames may exceed several million or more in quantity, the shortcomings of existing systems have limited and restricted their use. Heretofore existing systems have required a large storage volume for storing the large amount of document information. They have been restricted in application by the time required to search, derive and transport the document recordings. Other factors, such as the need to manually search and scan the recordings for specific information, difficulties in cross referencing, etc. have limited the application of currently existing systems. Furthermore, when two or more persons seek the same information or unit containing the recording thereof, a delay is experienced by one of the parties who must await the termination of the use of the record unit by the other and its return to the file before he can scan or monitor said unit. Other shortcomings of presently employed information storage systems include such factors as the requirement that the record unit or storage medium be physically conveyed or transported to the person seeking the information or he must travel to and from the file or storage container of said units to selectively obtain the information. Other factors which limit currently available systems include the wear of the recording medium due to handling delays due to manual operations necessary for scanning individual recordings, etc.

Accordingly, it is a primary object of this invention to provide a new and improved system for storing image and document information and for selectively viewing or monitoring said information from one or a plurality of monitor stations.

Another object is to provide a document storage and reproduction system which may be computer directed.

Another object is to provide an improved document storage reproduction system which is simple in construction and may be easily integrated into an automatic information transmission system employing a conventional telephone communication system.

Another object is to provide a system for storing image or document recordings and for selectively reproducing images thereof at one or a plurality of monitor devices by scanning said recordings and generating a train of picture signals without the need for individually selecting said signals.

Another object is to provide a simplified information storage and retrieval system having storage means occupying a minimal spatial volume and capable of storing millions of frames of image information and means for automatically reproducing images of said frames at one or more locations remote from said storage means.

Another object is to provide means for synchronizing the deflection of the scanning beam of a video camera with the movement of a plurality of image frames through the scanning field of said camera whereby said beam starts its scanning movement from a predetermined position in its field as a new frame enters said field and the cyclic frequency thereof is controlled by the movement of frames through said scanning field.

The invention, its objects and advantages, will be more fully understood from the following description when read in connection with the accompanying drawings in which:

FIG. 6 is a partial plan view of storage apparatus and shows means for mounting a plurality of video cameras thereon relative to a movable storage conveyor in accordance with the teachings of this invention;

FIG. 7 is a partly sectioned side view of FIG. 6;

FIG. 8 is a side view of a video camera and its mounting means which may be utilized as part of the apparatus of FIGS. 1 to 3 for scanning the storage system thereof;

FIG. 9 is a partial plan view of a modified form of the conveyor illustrated in FIGS. 7 and 8;

FIG. 10 is a side view of FIG. 9;

FIG. 16 is a partial view taken along a lateral plane of a modified scanner mount which is a modification of the mount illustrated in FIGS. 7 and 8;

FIG. 17 is a block diagram showing scanning and reproduction control means for the apparatus illustrated in FIG. 16.

Certain assumptions are hereinafter made pertaining to the circuits of the drawings forming a part of this invention in order to present them in as simple a form as is possible. It is assumed, for example, that the correct power supplies are provided on the correct side of all switches and controls as well as connected to all amplifiers, receivers, coded relays, signal generators, storage tubes and the like regardless of whether or not said power supplies are shown. Drives referred to for operating tape transports and switches are assumed to contain all the necessary controls and components according to the teachings of the art. Monitors comprising image retention screens or tubes may be provided in accordance with the teachings of the art or in accordance with those of my copending patent applications. The division of all circuits into two or more circuits are assumed to be effected by known junction techniques or by means of the proper transformers. Automatic switching systems are provided in accordance with systems of this type known in the art. Video camera and receiver deflection controls similarly are in accordance with those known in the art.

Figure 1:
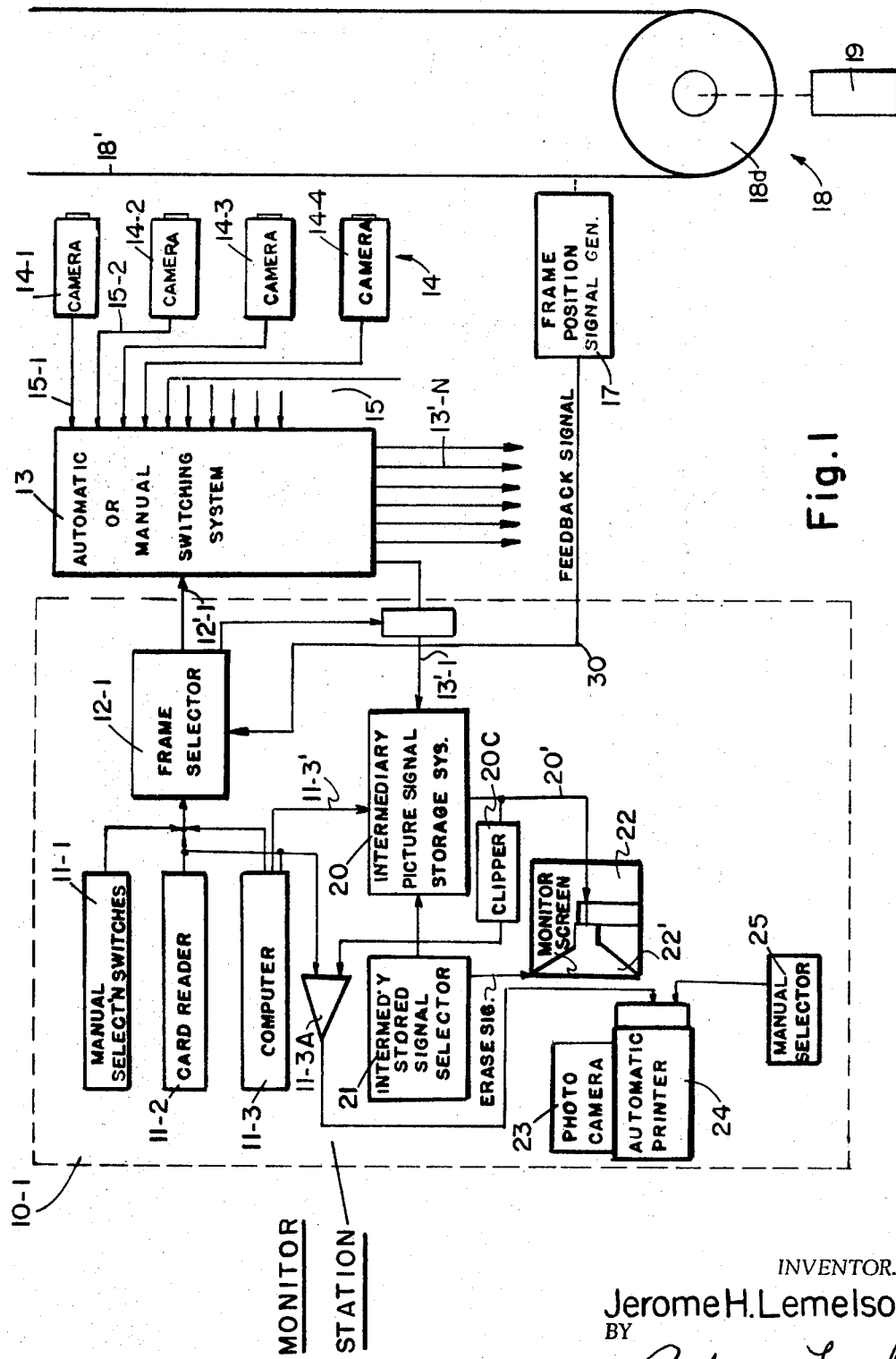
FIG. 1 is a block diagram of the general image storage and retrieval system.

Referring first to the block diagram designated FIG. 1, the illustrated informations storage system comprises a master information storage conveyor 18 having a belt 18'; scanning cameras 14 mounted off said conveyor for scanning its surface and frames of image information provided thereon, a switching system 13 for gating resulting picture signals from a selected camera to one or more of a plurality of receiving stations 10, each of which preferably has associated therewith signal storage and/or monitoring means. The information is stored in the form of recorded areas of belt 18' as frames of documents or picture images which may be developed in photographic film, or printed on photosensitive paper or the like. Said frames are mounted or provided in any suitable manner on the conveyor belt 18 and are preferably arranged in a plurality of aligned columns so that scanning of selected frames and the reproduction of picture signals at the monitor stations may be effected rapidly and without difficulty.

Whereas the cameras 14 may comprise any of a variety of designs of video scanning devices available for providing picture signal outputs of a scanned image field, a small video scanning camera which is available at this writing and measures but a few square inches in lateral cross-section is a miniaturized Vidicon scanning tube camera manufactured by several companies including Radio Corporaton of America and Westinghouse Corp. These may be mounted in any suitable array just off the surface of the conveyor belt 18' in a manner to scan said predetermined record containing strip areas of columns of said document recordings. The term conveyor belt as hereafter utilized, defines any flexible mounting for said image frames which is capable of being driven in a so called endless path of closed loop and may comprise a flexible web or a series of tandemly arranged rigid platens or flights which are pinned to each other or mounted on a chain so that they may be driven in a closed loop. The closed loop belt may also be replaced by an open loop device or an elongated rigid platen which is power driven in the manner to be described for the belt past said scanners 14 by means of a motor and drive means 19 which may be any suitable constant speed or intermittent powered motion producing device.

The scanners 14-1, 14-2, 14-3, 14-4, etc. are shown mounted in rows extending laterally across the conveyor in sufficient number and positioned such that each of said columns of image frames is scanned by at least one of said cameras. Other arrangements may be provided whereby two or more cameras scan the same column or conveyor strip from different locations along the belt or conveyor. If the conveyor is run continuously, the picture signal output of the camera or scanner close to the desired image frame may be selected for performing scanning functions so that there will not be a substantially long wait to retrieve said information.

As stated, a pluarlity of monitor stations are provided each operative by a different individual for viewing reproductions of selected images provided on the storage conveyor 18 or for otherwise utilizing the signals reproduced therefrom, such as for computer or documentation, or printing use. The illustrated monitor station 10-1 is provided with a viewing device such as a conventional video receiver 22 containing a picture tube 22' such as an image storage tube and the necessary signal amplifying and beam deflection control means for providing a still image on the face of said storage tube as the result of the receipt thereby of a selected picture signal which has been generated by a selector of the scanning cameras 14. Selection of a desired document picture signal or signals and the automatic transmission thereof when it is generated on the output of a selected camera in said system, is effected by means of a frame selector 12-1 which has a command-input from a bank of manual selection switches 11-1, a punched card reader 11-2, or a computer or other device 11-3. The frame selector 12-1 comprises in its simplest form, a rotary selection switch with inputs from each of said cameras and a single output which extends either to said monitor device for signal frame selection or to an intermediary picture signal recorder 20. In many literature or data searching functions, it is required to reproduce not one but a plurality of images of document pages recorded in succession. If the system utilizes as in FIG. 1 a long conveyor belt 18' which is in continuous movement, and it is desired to scan or visually monitor the material contained in a series of image frames, it will be to the advantage of the operator of the monitor apparatus to temporarily store said plural images in a manner such that they may be selectively reproduced thereafter by the operator without having to wait for the belt to recycle or the next frame to pass the selected camera.

The frame selector is connected to the automatic switching system 13 by means of an output line 12'-1 and the intermediate picture signal storage system 20 receives picture signals from said switching system over the selected one of the plurality of output lines 13'. For indicating which portion of the belt 18' of conveyor 18 is passing the cameras a frame position signal generator 17 is provided which generates a feedback signal or code signals to the frame selection means 12 which code is utilized to close and open a switch or gate 13'g in the input line 13'-1 at predetermined times during a cycle of operation such that only selected picture signals pass to the intermediary storage system 20 and are stored therein. The operation of the intermediary storage system by means of a further selection means 21 may be effected manually by the operator of the monitor station who selectively reproduces picture signals stored therein one at a time and effects the writing of the respective images on the screen of the monitor tube 22' for viewing and monitoring purposes. The system, which includes subsystems 20, 21 and 22, may be constructed and operated in accordance with one of the magnetic recording systems for recording and reproducing video image signals described and illustrated in my copending patent application Ser. No. 668,348 entitled Magnetic Recording Systems and filed on June 27, 1957 or any suitable erasable picture signal recording system. The notations 23, 24 and 25 refer respectively to apparatus for automatically printing, once energized, copies of the images appearing on the face of the monitor screen or tube 22' and includes an optical system or photographic camera 23, an automatic printer and hard copy processing machine 24 and a manual selector 25. When the latter is actuated by the person viewing or scanning the images appearing on the screen of 22', a controller such as a multi-circuit timer, automatically effects, by controlling the operations of servo motors and solenoids, the functions of photographing the face of 22' by control of the shutter of 23, and the developing and printing of the resulting exposed film or paper by operating the servo motor or motors, in the automatic printer 24 from which hard copy in the form of a print derived for use as a permanent record. Such an automatic printing means may comprise the copyflow machine made by the Haloid Company of Rochester, N.Y., which photographs and prints copies of documents or flat sheets fed thereto. If the optical system of such a printer is adjusted to receive an image from the face of the monitor tube 22' and the appartus is adapted to operate intermittently by means of a switch operated multi-circuit recycle timer of conventional design, then it may be used to photograph and print selected images appearing on the screen of 22' of FIG. 1. If said manual switch is replaced by a solenoid operated switch and the energizing input to said solenoid is derived from a computer or reader, such as 11–2 or 11–3, then the function of printing hard copies of the images reproduced from the conveyor 18 by video scanning may be effected automatically by energizing the controller of 24. If the control device 11–3 is a card-reader or other type of program controller, it is preferably programmed to generate signals in the proper sequence to effect the cyclic operation of the automatic camera and printer when an image is generated on the face of the screen of 22'. This is effected in one manner, by clipping the frame vertical sync pulse from the video picture signal transmitted from the intermediate storage system 20 by means of a differentiator clipper 20C and passing the resulting pulse signal to one input of a logical AND switching circuit 11–3A in the line 11–3' having its other input energized with a constant signal derived from the signal generating controller or reader 11–3. When both inputs to 11–3A are simultaneously energized, its output becomes energized which is utilized to energize the controller for the camera printer 23, 24. The controller 11–3A may also be a binary counter relay adapted to produce a pulse on its output after receiving two pulses on its input, with said input being connected to the output of both 11–3 and 20C. A system of this type utilizing both manual selection and automatic selection and printing means as described is quite versatile and capable of automatic data and document reproduction and transmission. A signal reproduced from the intermediary storage signal system 20 may also be utilized to effect the automatic operation of the automatic printing apparatus.

In another form of the invention the recording image frame mount or conveyor belt 18' is driven intermittently by a stepping motor 19 which is coupled to and rotates the sprocket of drum 18d of the conveyor 18. The drive means and locations of the rows of frames or pictures provided on or in 18' are such that, each time the conveyor comes to rest, individual frames thereof will be centered in the scanning fields of a camera and will remain therein for sufficent time to permit the camera to scan the image field and produce a picture signal on its output line 15, which signal is that obtained during at least one frame sweep of the read beam. The next movement of the belt 18' is such that other frames provided on 18' will next be centered in the scanning field of the scanner 14. The movement is preferably such that when one image frame moves out of a scanning field of a camera, the next frame appearing in its column will be moved into and will center in the scanning field of the same camera during the next cycle and said scanning cycle will be repeated for said next frame. In this system of image storage and reproduction, a different still image picture signal will be developed on the output circuit of each camera each time the conveyor 18 is stopped and selection means are provided in the form of a frame selector to perform the dual functions of effecting the correct connection between the monitor station and a predetermined camera and that of gating only predetermined picture signals, produced on the output of the selected camera, to the intermediate storage system 20 in use. A system of this type is operative to permit the ouput of any camera in the system to be simultaneously passed to a plurality of monitor staitons. If two of said monitor stations 10 simultaneously require that the same information or picture signal be received and recorded, it is not necessary for the operator at one monitor station to await the completion of the same scanning operation of another operator. Furthermore, complex control of each camera by remote means is not necessary.

The conveyor 18 may be mounted with its belt or hinged flights 18' extending horizontally, vertically or in a combination of directions or series of reversing loops to provide the maximum length thereof in a minimum cubic volume. The frame supporting the conveyor 18 is used to support the scanning cameras 14, power lines extending thereto and also supports coaxial cable utilized for picture signal transmission. The cameras 14 may be arranged in rows extending across the conveyor, each adapted to scan a respective column of image frames which pass through its scanning field. A single frame position indicator 17 may be provided to scan position indicating marks or codes on a channel or band area of the belt 18' for indicating the position of said conveyor and the frames thereon in relation to the cameras. A frame position indicator scanner 17 may also be provided for each bank of cameras. The necessity of providing plural banks of scanners 17 will depend on the precision in which the image frames are mounted, and if the conveyor consists of a series of flights or platens hinged together, the degree of backlash thereof.

The system of FIG. 1 is also applicable to storage and reproduction functions other than deriving selected frames of image information. The conveyor 18 may contain on its belt section 18' a plurality if objects or articles such as products or manufactured items in process. The cameras may be positioned to scan normal to the surface of the conveyor or from the side thereof. The cameras 14 may be conventional video cameras adapted to provide a motion picture on the screen of the video monitor to which it is connected or a still picture of the object or article thereon which is generated in the same manner as if the camera were scanning an image frame or picture as described hereafter. The system may be employed for the visual selection of one or more of a plurality of articles or products by one or more observers at remote locations or for the inspection of one or more articles or products at said remote locations. The switching system 13 may be a conventional automatic telephone switching system whereupon the conveyor 18 may contain individual articles or rows of different articles the images of which may be viewed by subscribers to the phone system on their respective monitor screens after a connection with one of the cameras 14 has been made by means to be described hereafter. The purchase or selection of a particular article may be effected by verbal order over the phone line or by means of a tone signal which is generated when the subscriber manually actuates a switch of a tone generator. A relay responsive to said tone and located near the conveyor 18 may be used to effect the removal of the article from the conveyor 18' by actuating a servo.

The computer or control device 11-3 is also shown connected to the input of the automatic printer 24, for effecting the automatic printing of predetermined of the image reproduction derived from scanning predetermined areas of the belt 18'. Since the computer 11-3 or the card reader may be utilized to automatically control the reproduction of signals from the intermediate storage system 20, it would be a relatively simple control function to effect the energization of the control for the automatic printer 24 by generating a signal on the input line 11-3' from 11-3 to 24 at or just after the signal is generated to energize the control for effecting the reproduction of the picture signal from the intermediate storage system 20.

One or more of a number of techniques for scanning the columns of image frame recordings to generate picture signals may be employed. Four systems are briefly described as follows:

In a first system the image scanning means comprises a video scanning camera or flying spot scanner having a read beam adapted to continuously scan back and forth along a predetermined scanning line while the conveyor and column of image frames moves past said scanner at substantially constant speed such that the requested vertical deflection is provided by the image field in motion. The speed of the conveyor and the scanning rate of the beam being such that the resulting picture signal may be utilized to intensity modulate a so called image write-tube or to provide a still image on its display face or screen. For such an arrangement the beam of the scanner is automatically operative to return to a position where it again initiates scanning. During return sweep the beam is in a condition of substantially zero potential to simulate the conventional line blanking function. The scanner may comprise a flying-spot scanner of the type described in the March 1949 issue of the RCA Review which provides a beam of light which scans at right angles to the direction of motion of the image column, the light being intensity-modulated after passing through the image recordings which are images developed in transparent film. A receiver tube such as a photo-multiplier tube is mounted to receive the modulated light from the scanner after it has passed through the image on the film. Said receiver is positioned on the other side of the film and provides a resulting modulated picture signal output. The picture signal is produced as the result of the modulation of the light from the flying-spot scanner as it passes through areas of different density on the film. The resulting picture signal output is passed to the monitor station which is connected to the scanner and only those portions of the video picture signal so generated which pertain to selected image frames in the selected record column are gated to an intermediary storage means of a monitor station for play-back through devices such as the video receiver thereof. The blanking portions of the video signal defining the interval between consecutive frames is produced by providing areas between each stored image frame which are black in nature so as to produce a video signal simulating the so called blanking or black signal portion of the picture signal. For such a system the frame sync signal or vertical sync signal is not required since the vertical motion is attained by the movement of the film and the flying-spot scanner merely sweeps its beam back and forth across the film at a constant rate as the film moves at constant speed. If a vertical sync signal is required for reproducing the information derived by scanning a single frame said sync signal may be derived from scanning the markings or code at the edge or margin of the conveyor.

A second system employs intermittent movement of the camera in the same direction that the column of image information is moving and in a manner such that said camera will travel at substantially the same speed as the document recording to be scanned whereby the recording is stationary in the scanning field for a period of time sufficient to permit the camera to scan by conventional means the selected image frame.

A third means applicable for scanning includes intermittently moving the conveyor carrying information recordings in a manner such that one frame is conveyed at at time into the scanning field of a conventional video scannig camera and remains there for a sufficient period of time to permit at least one screen sweep of the camera scanning beam. Thereafter, the document recording is conveyed out of the scanning field image field a degree so as to position the next image frame to be centered in said camera scanning field.

In another system individual image frames or document recordings are each provided on an intermittently fed base or card. Strips or groups of said frames pertaining to a particular subject may also be provided on a single card or platen which is one of a plurality of said cards. If the card bases are punched cards provided with conventional automatic selection and coding means they may be selectively or continuously fed through the scanning fields of said scanning cameras in a continuous movement to provide individual frames or rows of said frames of images on a card in the scanning fields of respective cameras in the same manner hereinabove described for the belt or conveyor 18' save that the driving or feed means for said cards is modified in accordance with the spacing of the frames. Card selection, control of movement into and out of the scanning fields is preferably provided by known card feeding apparatus. By providing said image frames mounted on a plurality of plates, flights or cards which are individually handled and continuously or intermittently moved into and out of the scanning fields of said rows of cameras, the changing of image frames or addition thereto may be easily effected without the necessity of stopping said feeding function by employing known card sorting apparatus. The conveyor 18 may serve as a means for conveying said document recording cards or plates into and out of said scanning fields of said cameras.

Figure 2:
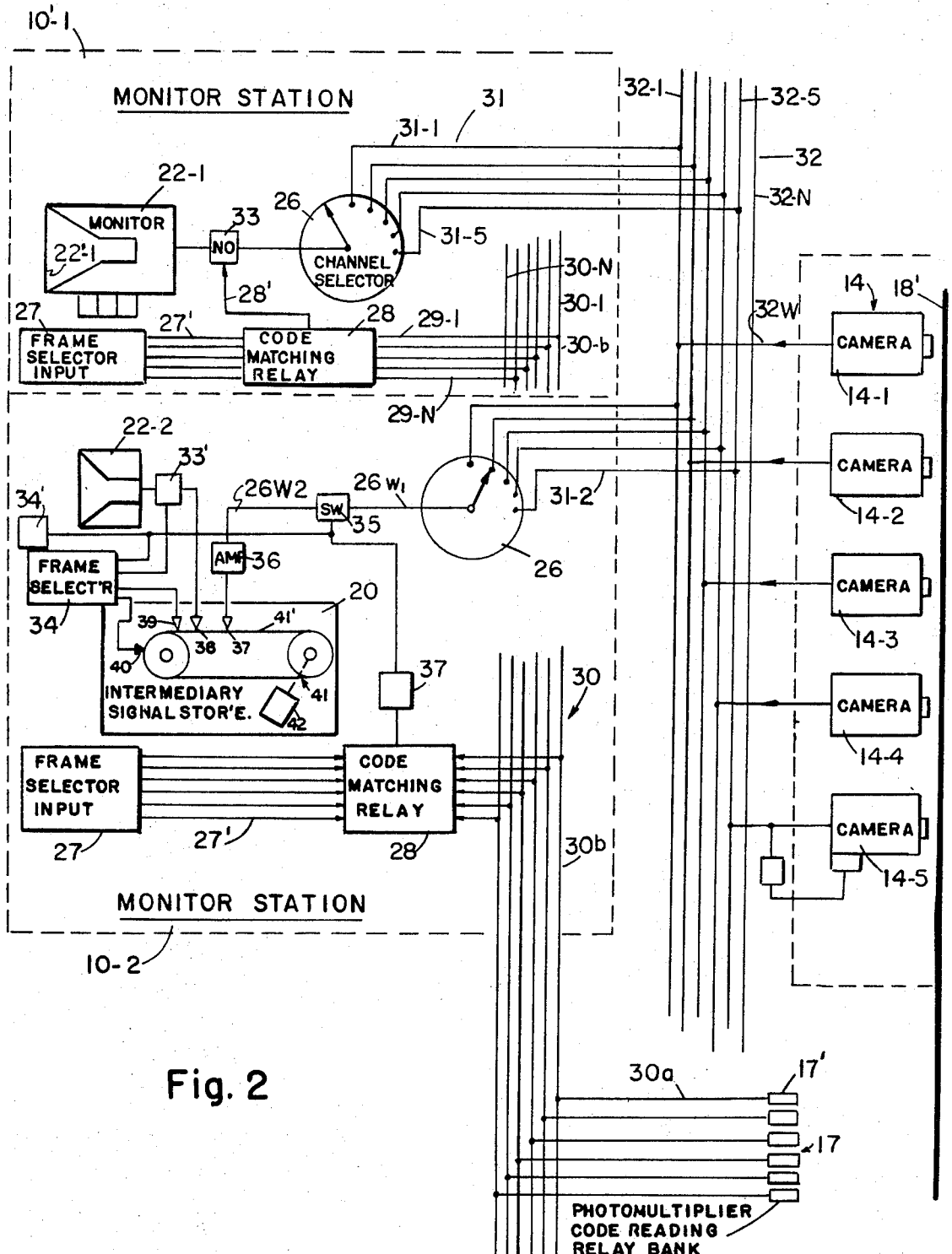
FIG. 2 shows further details in block and schematic form of the system of FIG. 1.

FIG. 2 shows further details of the image storage and selection system of FIG. 1. Two monitor stations are illustrated. One, 10'-1, is provided with means for reproducing the information recorded on single images from the storage system 16 and providing said information in the form of images on the face of a storage tube 22-1. A second monitor station 10-2 is provided with means for storing a plurality of selected picture signals in an intermediate storage system 20 and also includes means for selectively reproducing said signals therefrom to provide respective images on the face of the monitor storage tube 22-2 thereof.

Referring first to the apparatus of the monitor station 10'-1, the camera circuit selection means comprises a rotary selection switch 26 having multiple input circuits 31-1 each extending from a respective circuit 32 of a plurality of video carrier circuits or cables 32-1 to 32-N. Each of the circuits 32 extends to a respective output 32w of a single video scanner 14 on which said picture signal is first developed. Each cable of the group 32 extends not only to a respective input of the rotary selection switch 26 but to inputs of each of the other selection switches of other monitor stations in the system so that a picture signal developed on its respective line 32 will be available at each of the monitor stations if the selection switch of said stations are adjusted to effect the circuit connections. The channel selector switch 26 may be manually operated by manual rotation of the switch arm 26a and is equivalent in function to that part of the automatic switching system 13 of FIG. 1 which connects one of the camera outputs 15 with the input to the particular monitor station. The selection of a specific document recording signal of the picture signals generated on the selected circuit by scanning a selected column of image frames on the conveyor, is effected by means of a frame selection means which comprises a code matching relay 28 and a normally open gate or electronic switch 33 which is energized to close when a signal is generated by 28 on its output 28 which extends to the switching input of 33. The code matching relay 28 is programmed by means of a frame selection switching means 27 and is adapted to receive feedback signals, preferably in the form of a parallel binary code or the like, on plural inputs 29 thereto from a battery or row 17' of photoelectric scanning relays which are mounted off the conveyor 18 which read position indicating marks in the form of a strip or band code along the conveyor. The marks read by the photomultiplier relay bank 17' cause the multiple outputs 30a thereof to respectively be energized and deenergized in a particular code array and each of the photo-relays of bank 17' is connected to a respective of the inputs 29 to the relay 28 and to all other code matching relays of similar function in said system by means of respective circuits 30. The operation of the code matching relay 28 will be described hereafter. In brief, it functions by providing a parallel code output when the selected image frame is in the scanning field of the selected camera, said code being used to gate the picture signal produced when said camera scanning means scans said selected frame to the input to the monitor 22–1 where it is utilized in the manner described in my said copending application to provide an image on the screen of the storage or video picture tube thereof. The gating of just one picture signal to the monitor 22–1 is effected by either providing the gating signal on line 28' for the interval necessary to maintain the monostable switch 33 closed long enough to permit a complete frame picture signal to be passed therethrough to 22–1 or by providing switch 33 as a normally open, slow-to-open after closing switch which remains closed once its switching input is energized by a signal appearing on 28' for a period of time sufficient to pass the selected video picture signal to the completed circuit.

The monitor station 10–2 is provided with an intermediate picture signal storage system 20, the complete details of which are not shown but which are detailed from my said copending application. In said copending application, either of the magnetic recording video signal storage and reproduction systems may be employed as the intermediary storage system 20 of FIG. 2 of this application. The selected video picture signal is gated through a normally open switch 35 and is passed through a recording amplifier 36 before energizing the recording transducer 37 and being recorded as a picture signal on a length of magnetic storage medium such as an elongated and closed loop magnetic tape 41'. The magnetic tape 41' is driven in a closed loop on a tape transport 41 which is power operated at constant speed by means of a servo drive 42 which may be started in operation prior to said switching function whereby it is operating at constant speed by the time said selected signal or signals appear at the input to the gate. If the switch 35 is adjustable so that its opening time after being closed by a signal from 28 may be varied by selected and predetermined degrees, then a plurality of consecutively generated picture signals appearing on the input 26'w may be passed to the recording amplifier 36 and recorded on the tape 41' for the monitoring thereafter of consecutively scanned images in a particular document storage of column on the conveyor. The notation 33' refers to a normally-open switch in the circuit of the picture signal reproduction amplifier associated with reproduction head 38 for gating signals, recorded on 41', one at a time to the monitor 22–2. Said picture signals may comprise composite video picture signals including blanking and sync components combined to effect modulation of an image generating means such as the write-beam of a video storage tube 22'–2 of the monitor device 22–2. The closed loop tape 41' and transport 41 may also comprise a magnetic recording drum or tape transport which includes a magnetic tape driven between two reels or drums. Notation 37 refers to an adjustable delay line in the output of the code matching relay 28 operative to account for any differences between the generation of said frame indicating signal and the time the selected picture signal appears at the input 26'w of the switch 35. The switch or gate 35 is preferably selectively adjustable by hand or by means of a signal from the frame selector 34 to remain closed for the time duration, or multiples thereof, it takes for a single video picture signal to be generated so that one or a selected number of consecutively produced picture signals of different image frame sweeps derived from scanning a selected column of the conveyor 18 may be passed therethrough.

Figure 3:
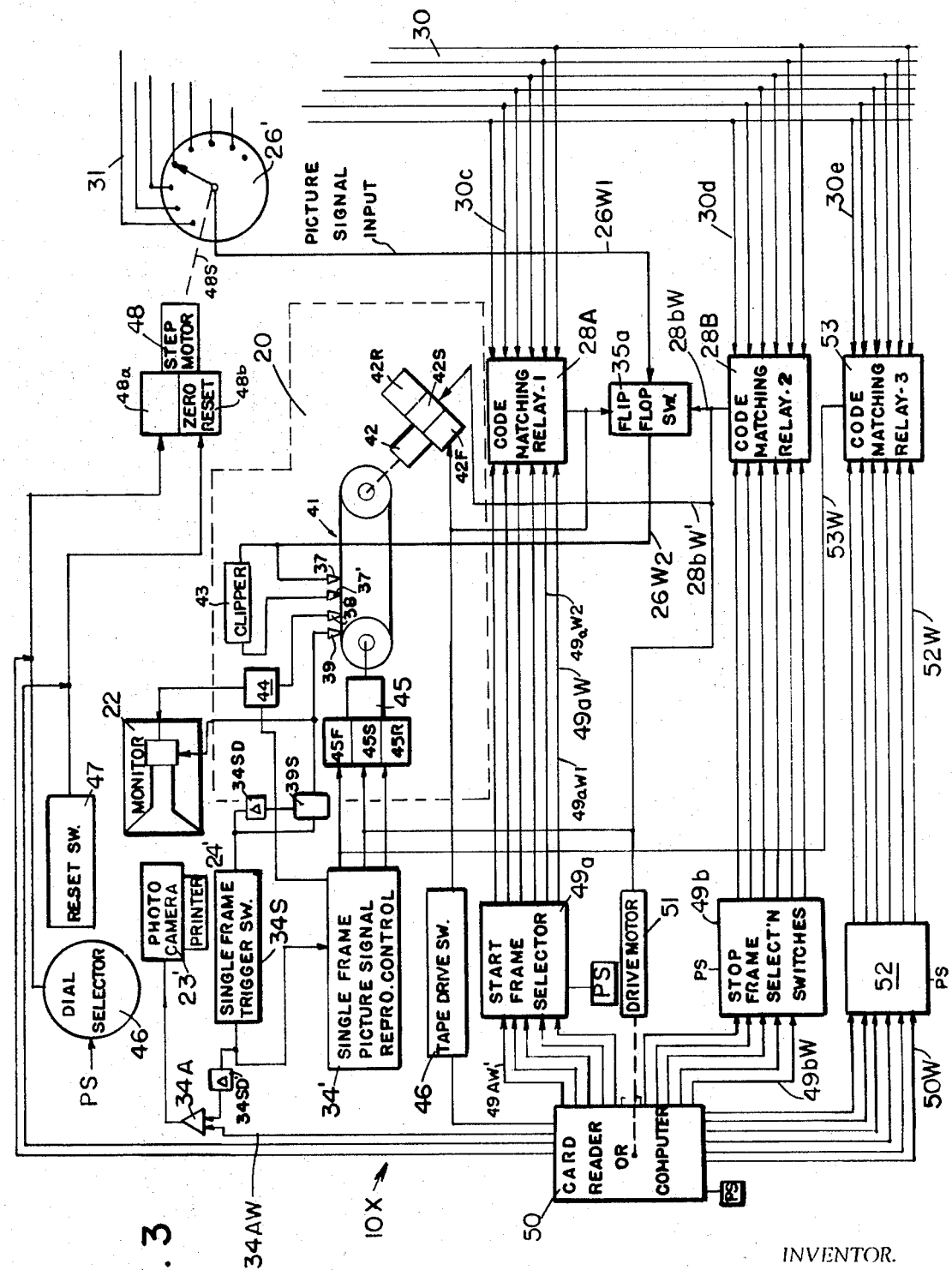
FIG. 3 shows in block and schematic form still further details of the selection means of FIGS. 1 and 2.

Whereas in FIG. 2 manual means are provided for adjusting the time a video signal gate remains closed, in FIG. 3 the end limits of the train of video picture signals desired to be recorded on the recording medium of 20 are determined by means of a pair of code matching relays each having inputs connected to the common code circuits 30 and each operative to respectively close and open a bi-stable gate for gating just the selected number of picture signals therethrough. If, for example, it is desired to monitor a particular multi-page report containing a predetermined number of pages and it is known which column contains the recordings of said pages and the location of said frames are known (i.e. the first row in which the first recorded frame occurs as well as the final row in which the last frame appears) then the frames may be selectively reproduced by generating codes associated with each of said rows which codes are each provided adjacent to the first and last frames. Selection may thus be effected by providing each of said codes on respective inputs of a pair of code matching relays and energizing said relays to respectively close and open a bi-stable switch operative for passing the output of the selected video scanner during the interval between which said codes are generated as their recordings pass the scanning bank 17'. Since this is the interval during which the desired or selected frames of said report pass through the scanning field of the selected camera, only the selected picture signals pass through said gate. It is noted that such selection code matching relays may also function to gate power to operate the scanning means of the selected camera or to operate a camera shutter to open and close whereby only the selected images will be scanned. However, if the system is to employ plural monitor stations any one of which may require the same picture signals transmitted to another station at the same time, the control and selection means of FIG. 3 will suffice to effect such simultaneous transmission of the same picture signal to different monitor stations in said system.

In FIG. 3, the operator of the monitor station effects a connection between the picture signal output of a selected scanning camera (i.e. the picture signals derived from scanning a selected column of frames of the conveyor 18 and an input 26'w to his monitor apparatus by means of a dial selector switch 46 or the like). The rotary dial switch, when actuated, transmits a predetermined number of pulses to a stepping motor 48 which steps the rotary contactor arm 26'c of rotary switch 26', the inputs to which are each connected to one of the lines 31 which are respectively connected to camera output. A manually operated reset switch 47 is used to reset the stepping motor shaft 48s to zero. The reset switch 47 may start a motor coupled to the shaft of the stepping motor, which drives said shaft in reverse until the zero position has been reached whereupon said reset drive is stopped by means of a limit switch.

Before dialling switch 46, the operator presets a control means which automatically effects the gating thereafter of only selected picture signals to the intermediary storage apparatus at the monitor station 10x. Gating is effected in one of several manners. Illustrated in FIG. 3 are two frame determining relays 28a and 28b which permit the gating of a predetermined number of consecutively produced picture signals to the image storing input 26w2. This will permit the visual monitoring or scanning of a predetermined number of consecutively scanned image frames which appear in the column scanned. The output of the camera scanning said column is determined by the position of the rotary switch 26'.

Figure 5:
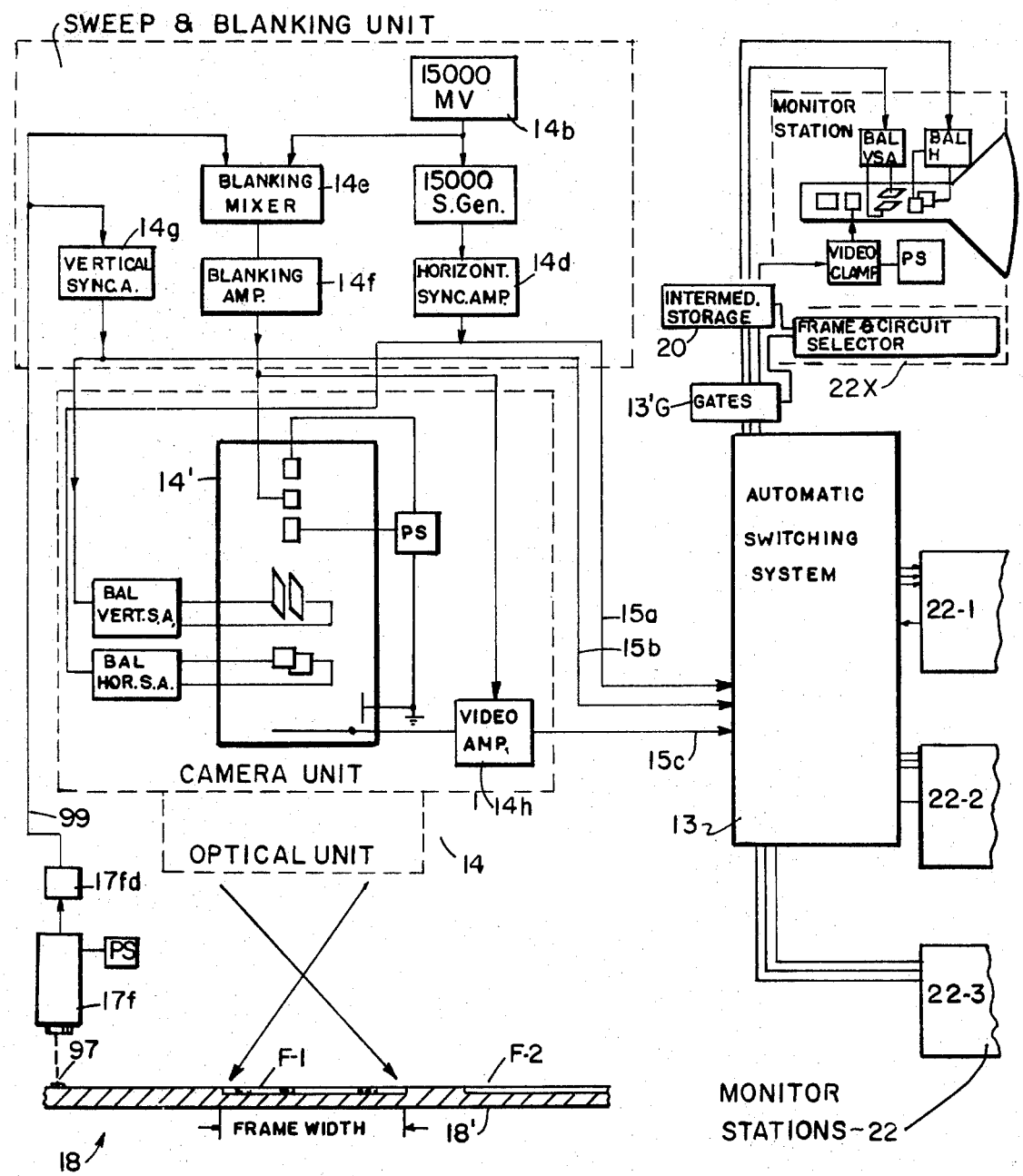
FIG. 5 is a diagram showing details of the control means for a video scanner as utilized in FIGS. 1 to 4.

The frame picture signal gating control means of FIG. 3 comprises a pair of code matching relays 28a and 28b each of which is adapted to provide a control signal when a code derived from scanning the code tracks of the conveyor 18 is present on a plurality of input lines 30c and 30d to each relay. Details of such a code matching relay are shown in FIG. 5 which comprises a plurality of logical switching AND circuits arranged relative to respective circuit matching inputs such that, when any predetermined order of a first array of said inputs is energized, an output signal will be provided from said relay if the same order or code array is present on the second array of inputs. The first array of input lines 49aW' to the code matching relay 28A is "set-up" in binary code form by means of a "start-frame" selector panel of switches 49a which comrpises a plurality of switches. One in each of the circuits 49aW–1, 49aW–2, 49aW–3, etc. to relay 28A, which are actuated by manual, punch card or other means in an order to provide a predetermined code on the input side of 28A. In other words, the lines 49aW are respectively in either a state of energization or are de-energized in such an array to provide a predetermined parallel code such that when respective lines of the parallel feed-back circuits 30a to 28A are energized in the same order the relay 28a will become activated and produce a signal which may be used for gating purposes. The feed-back lines are connected to the banks of photoelectric relays or photo-multipliers adapted to scan the border of the conveyor belt 18' containing position indicating codes. The feed-back circuits 30 from the bank of conveyor reading photomultiplier relays 17', shown in FIG. 2, extend throughout the system and each of the code matching relays in said system are connected thereto.

The output of the rotary selector switch 26' is connected through a flip-flop switch 35a to the recording transducers of the intermediate storage system 20. The switch 35a is closed upon receipt of a signal from the code matching relay 28A generated on its output 28aW and opened upon receipt at its other switching input of a signal from a second code matching relay 28B generated on its output 28bW. The relay 28A is preset by means of a bank of start-frame selection switches 49a which provide the input lines 49aW in states of energization and de-energization in accordance with the desired binary code read by the photomultiplier tubes when the first image frame of the selected column of frames appears at the connected camera. The relay 28B is similarly preset by means of a bank of stop-frame selection switches 49b, which like those of 49a connect a power supply PS in circuit with respective of the inputs 49bW to said relay 28B in accordance with the desired code scanned by the photomultiplier tubes 17' as the last image frame in the selected column leaves the scanning field of the selected video camera. Thus, the circuit 26W1 is connected to 26W2 only during the interval the desired picture signal or signals are present at the input of the switch 35a so that only the desired signals are recorded on the constant speed moving tape 41'. The numeral 43 refers to a clipper which is connected to the input line 26W2 and is adapted to receive the video picture frame signals generated thereon and to clip the frame vertical sync signal therefrom and provide it as a pulse output which is recorded by means of a recording head 37' adjacent the position of the picture signal recorded by head 37 to thereby indicate the location of the start of said picture signal. When said pulse is reproduced by reproduction transducer 39 it may be used as a feedback signal to gate only the picture signal associated therewith to the monitor 22 and as a means for further controlling the motion of the tape 41'.

The intermediate storage system 20 of FIG. 3 is illustrated as including a drive motor 42 which is adapted to operate at constant speed after a starting input 42F thereof is energized and when a drive switch 46 is actuated. Although illustrated as separate units, the drive servo 42 may be combined as a single drive with a second illustrated drive servo 45 for the tape transport 41. For the purposes of simplifying the description, the drive servo 42 is assumed to drive the tape 41' at a constant speed past the heads 37, 38 and 37' for recording of picture signals received from the storage system on input 26W2 while the servo 45 with its associated start control 45F, stop control 45S and reversing control 45R is utilized in moving said tape in the reproduction of signals therefrom. The start control 42F of servo 42 is energized and gates power to 42 by means of the start switch 46 which is actuated to close by a signal from a computing device 50 during said other selection functions sufficiently in advance of the appearance of the selected picture signals on the line 26W1 to permit the tape 41' to be accelerated to constant recording speed. Thereafter, energization of the code matching relay 28A closes switch 35a which remains closed until the last desired signal in the chain of said signals has been produced by the selected camera whereupon the code matching relay 28B produces an output signal which opens the flip-flop switch 35a. Said output signal generated on the output 28bW of 28B is also passed over circuit 28bW' to the stop control 42S of servo 42 whereupon the tape forward motion is automatically stopped.

If it is desired to start the motion of tape 41' just before the first of the selected picture signals appears on the line 26W1 a third code matching relay 53 is provided which is preset by providing its inputs 52W in the desired array of energized and de-energized states by the actuation of the switching bank 52 which gates a power supply to respective of said circuits in the desired parallel code order. The code so imposed on the inputs 52W to 53 is such that a signal will produce on its output 53W by the receipt on its feedback inputs 30e of a similar code from the photomultiplier circuits 30 sufficiently in advance of the reproduction of the first of the selected picture signals to be utilized to start the drive servo (45 or 42) or the control therefore such that it will be driving the tape 41' at constant recording speed just as the first selected picture signal is being generated or shortly thereafter. Thus, several trains or groups of consecutively reproduced picture signals derived from scanning tandem arrays of image frames on the conveyor may be recorded on different lengths of the tape without risk of erasure or of recording of one signal over another which may occur if the tape 41' is driven at constant speed at any desired time during the described information retrieval functions. The output of relay 53 is passed to the forward start control 45F of 45 while the output of 28b is passed to the stop controller 45S of 45. In the latter described arrangement, the drive servo 42 may be eliminated since the servo means 45 serves the dual functions of driving the tape 41' during recording as well as reproduction. If it is desired to record at a fast speed in accordance with frequency of the received picture signals which may be in the two to four megacycle range if the scanning cameras are conventional television cameras and to reproduce at a slower rate for effecting the producton of an image of the screen of a slow scan monitor such as 22' then the drive 45 may be employed as an auxiliary servo operating at the desired slow speed while 42 is inoperative for reproduction of the recorded picture signals on tape 41', and the outputs from 28b and 53 may be respectively connected to start control 42F and stop control 42S of servo 42 instead of to servo 45 as illustrated.

In the single frame picture signal reproduction controller 34' are switches for starting, stopping and reversing servo 45 and automatic control means (as described in my said patent) for effecting, when actuated, the reproduction of a single video picture signal from the train of said signals recorded on 41′ and for utilizing said picture signal to modulate the image forming means of the monitor 22. The picture signals recorded on 41′ may be individually reproduced at the will of the operator of the monitor station, each of which picture signals generates a different image on the storage or video tube 22′ which may be viewed as long as desired and may be automatically erased when the next image is generated. The single frame picture signal reproduction controller 34′ may comprise a multi-circuit self-recycle electronic timer adapted, when energized by the reproduction of the frame indicating pulse transducer by head 39, to effect a reproduction cycle which includes the starting of servo 45, the closing of normally open gate 44 just as the next selected picture signal is reproduced by head 38 and transmitted to its input, the closing of normally open gate 44 when said next picture signal has passed to 22, the stopping of servo 45 and the control of its further motion to reposition the tape 41 for reproduction of the next picture signal recorded thereon when 34′ is again energized.

It is noted that the presetting or setting up of the code matching relays, 28a, 28b and 53 as well as the starting of the tape drive servo may be automatically effected by means of a computing and signal generating device, such as a punched card reading device. Such a device 50 is illustrated in FIG. 3, the details of which are not shown since various punched card reading devices of this type are available commercially. In order to simplify the diagram and description, the device 50 is assumed to comprise a drive which when operated by means of a servo 51, feeds a punched card which may comprise one of a plurality of cards stored therein, through a bank of reading switches when the servo 51 is energized by receipt of an input signal. The movement of the card into the reading part of the machine maintains certain of said reading switches open while closing others thereby connecting certain of the output lines with a power supply PS while maintaining others in states of de-energization. The output lines from 50 are connected in banks of circuits 49aW, 49bW and 52W to the frame selection banks 49a, 49b and 52 or directly to the respective code matching relays 28a, 28b and 53. The utilization of banks of switches 49a, 49b and 52 permits the apparatus to be programmed either manually or automatically of said switches are actuable by monostable solenoids having their energizing inputs connected to the power supply PS of 50 through the switches in said card reader. Automatic and intermittent operation of the card reader 50 may be effected by energizing the drive servo 51 by means of the signal produced by relay 28b. Said servo 51 may be a solenoid operated ratchet-pawl mechanism adapted when energized by a signal from 28b to effect the movement of the card in the reading portion of 50 away from said mechanism and the feeding of the next card stored therein into said reading position. A switch in the bank of said punched card reader 50 may be closed by means of a cutout in each card and transmit a signal to the tape drive switch 46 or directly to the starting control of either 42 or 45 to start the motion of said tape 41 for recording or said movement may be initiated by means of the signal generated by 53 at the desired instant in the cycle.

The punch card reader 50 may be replaced by any known type of controller which will effect the same switching functions including a manual operated sequential controller.

Figure 3A:
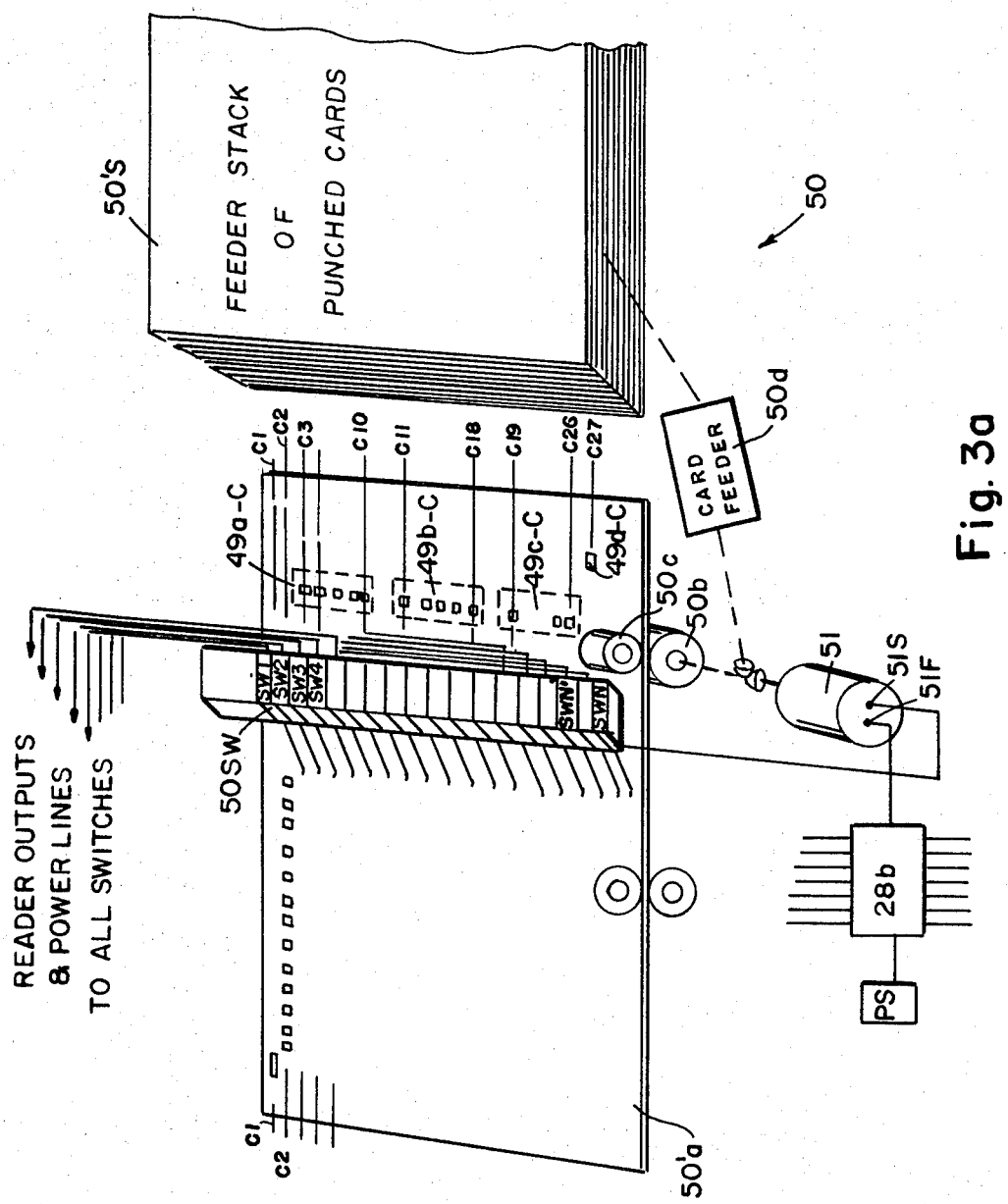
FIG. 3a is an isometric and schematic view of automatic selection and retrieval apparatus applicable to FIG. 3 for the automatic reproduction of chains of picture signals from the storage system thereof.

FIG. 3 also illustrates means 23 for automatically effecting the permanent or hard copy recording of the images reproduced on the face of the monitor screen of monitor 22 in the form of photographs, photostats or the like. In FIG. 1 mention was made of an automatic camera and printer unit positioned to scan the face of the monitor screen or tube 22′, which, when actuated either manually or by means of an output from a computing or sequencing mechanism, automatically effect the photographing or printing of an image of the face of the monitor tube. In FIG. 3, the photoprinting mechainsm, referred to by the notations 23′ and 24′ may similarly be operated by the manual actuation of a switch controlling a sequential controller such as a multi-circuit timer which effects hard copy production of the image of the monitor screen, or by automatic means including a control signal generated by the card reader 50. In FIG. 3a the card reader 50 is shown as including means for closing a plurality of switches, some of which effect control functions by gating signals to start and/or stop servo motors and the like. One of the switches in 50 is utilized to energize a control circuit 34AW which extends therefrom to a switching controller 34A. When the controller 34A receives a signal on a second input, which is generated after an image has appeared on the face of tube 22′ of the monitor, and after its other input 34AW has been pulsed or energized, it (34A) generates an output signal or pulse which is transmitted to the input of the sequential controller or multi-circuit timer for the printer 23′, 24′, thereby effecting the photographing and/or printing of a picture of the image on the face of 22′.

The switching unit or control 34A comprises a logical AND switching circuit adapted to transmit a pulse on its output when both of its inputs are energized provided that the card reader output 34AW remains energized during the cycle (i.e. while the card which effects the frame selection is in the reader 50). The other input to 34A is derived from the output of the single frame trigger switch 34S so that, if 34AW should be energized, the camera-printer mechanism 23′, 24′ will photograph and reproduce a print of the face of the monitor screen. The notation 34SD′ refers to a time delay relay between 34S and the input to 34A which delays the pulse output of 34S a sufficient period of time to permit the image to be written onto the screen of the monitor tube 22′, so that the camera and printer mechanism will operate at the proper instant.

For automatic reproduction of a plurality of picture signals recorded on the tape of storage unit 20, it is necessary to either by-pass the single frame selection switch or controller 34′ or actuate the single frame trigger switch 34S automatically at the correct time intervals to simulate the repeated manual operation of 34′. This may be effected quite simply be gating the output of reproduction transducer 39, which is a frame indicating pulse used to actuate the single frame trigger switch 34S, to a delay line or time delay relay 34SD the output of which is a pulse and is passed to the input of 34S a time delay after it (34S) has been energized by the original signal such that the prior picture signal reproduced from the tape has been recorded on the face of monitor tube 22′ and photographed. The output of 34SD therefore triggers the next cycle and continues to do so until no more frame indicating pulses are reproduced by 39. This occurs after the last picture signal has been reproduced from 20. The single frame trigger switch 34S is preferably both manually operated for manual selection of single frame signal reproduction from 20 and relay or solenoid operated for the automatic gating of a control signal thereby to 34′ and 34SD′ when automatic operation is desired. The notation 39S refers to a manually operable switch in the line of 39 and 34S as well as 34SD which would be opened when it is desired to effect single frame monitoring by operating 34S by hand. The output of 39, which is a reproduction of the picture signal indicating clipped-vertical-sync signal recorded through 37′, may also be passed directly to the deflection circuit controller of the monitor 22 to effect clearance of the storage tube and/or trigger the deflection chain thereof in advance of the receipt of the picture signal passed through switch 44.

For automatic operation of the apparatus of FIG. 3 utilizing the described card reader and feeder 50, it may also be desired to effect the automatic selection of one of the plural video signal circuits 31 to derive signals produced by scanning a predetermined channel. This may be accomplished by generating the desired number of pulses when a card is fed into the reading mechanism of 50 to step the stepping motor 48 the desired number of times from a zero start to automatically position the rotary switching arm 26′a of the rotary switch 26′ against a presented contact of 26′ whereby the desired circuit connection is made. FIG. 3a illustrates schematically how this function may be effected by means of the card reader 50.

In FIG. 3a, the automatic card reader 50 is shown as including a drive for individual cards fed into the reading section of said reader which comprises a plurality of switches SW-1 to SW-N or contactor elements each of which is in series circuit with a power supply and the respective output lines shown in FIG. 3. Each of the normally open switches in the bank 50SW is closed energizing one of the output circuits of said reader 50 when the arm of said switch rides in a hole or cutout in the card. Said cards are fed one at a time by means of a card feeding mechanism 50d, designed in accordance with the features of known card feeders, into the reading section beneath the switches 50SW and is driven partly therethrough by means of a servo 51 which also drives the card feeder 50d by means of gears when said servo is energized by means of a pulse received on its input from, for example, the code matching relay 28B which becomes energized when the prior reading cycle has ended and the last frame signal has passed through the selection switch and gate 35a as described. The card 50′a is engaged between a drive roll 50b and a depressor roll 50c and driven away from the feeder stack of cards 50′S as servo 51 operates and turns 50b. The servo 51 may be stopped automatically or by means of one of the switches in the bank 50SW which closes and energizes the stop control 51S for said servo when the respective switch is closed as its arm rides in a hole in the card. The switch activation which effects the stopping of servo 51 is caused by a card positioned in lateral alignment with areas of the card designated in FIG. 3a as 49a–C, 49b–C and 49c–C. In these scanning tracks are provided cutouts which are arranged in the order of the dsired codes for setting up the code matching relays 28A, 28B, and 53. The switches in the bank 50SW which sweep said tracks are opened and closed in the desired code order and are connected in respective output circuits of the reader 50 which are referred to by notations 49aW′, 49bW′ and 52W shown in FIG. 3.

The first switch SW-1 in bank 50SW is adapted to sweep a first channel C-1 of the card and provide a start signal which is transmitted to the start control 42F of the servo driving the tape of the intermediary storage system. The next switch SW-2 generates a plurality of pulse signals on the circuit 46W to actuate stepping motor 48a and preposition the selection switch 26′ for gating the selected picture signal therethrough from the connected camera in the system. The notation 42F–C refers to the cutout in card 50′a which closes switch SW1 and 48a–C to the plural holes in channel C-2 which are operative to generate pulses by closing and opening switch SW-2 as the card is driven through the reader. The switches scanning channels C3 to C10 are disposed between circuits 49aW′ and a power supply. When closed by means of a cutout in the card, they energize or deenergize these circuits in the desired coded array. The switches C11 to C18 are connected in circuits 49bW′, C19 to C26 comprising a group of circuits 52W. A switch SWN′ scans channel C27. When closed as it scans cutout 49d–C, is a signal which is generated thereby on circuit 47W and is operative to effect the resetting of switch 26′ by energizing the zero reset servo 48b and driving the shaft of said stepping motor to a start or zero position. The reset servo 48b may be a motor adapted to drive shaft 48S in the opposite direction to which it is driven by stepping motor 48 and said shaft is stopped by means of a limit switch actuated when 48S homes.

It is noted that the card reader of FIG. 3a, when applied as the selection controller 50 of FIG. 3, may be utilized to automatically effect circuit connections between the input to the monitor station and a selected of the scanning cameras by controlling, for example, selection and connection means of an automatic telephone switching system. This may be effected by providing the necessary switches in the bank 50SW to simulate the switching functions during telephone circuit dialing and recordings or holes in the punched cards to effect such function. The column C–2, for example, may contain cutouts therein which are spaced and adapted to simulate and produce the code or pulse trains necessary to effect the switching system whereby a predetermined connection is made with a selected camera and the input to the monitor station. Columns adjacent to C–2 may be used to effect the transfer or stepping signal functions of an automatic telephone system by effecting the generation of those signals necessary to automatically effect a line connection. One of the switches in bank 50SW may also be adapted to close when the card comes to rest and to energize line 34AW for the purpose described.

Further variations are noted in the apparatus utilized in the systems for image storage and retrieval illustrated in FIGS. 1 to 3. The transducers for scanning and reproducing signals of images recorded on the storage conveyor 18 as well as the means for recording said images may be provided in forms other than described. For example, Pat. No. 2,657,377 relates to apparatus and a method for recording signals in a two dimensional pattern of varying magnetic polarity on an elongated magnetic recording medium and for transducing said pattern into a pictorial reproduction of the original signal. Recording and reproduction scanners of the type proposed in said patent may therefore replace the heretofore proposed video cameras with the image frame recordings comprising signal recordings of the type taught in said patent. The conveyor 18′ may thus comprise an elongated magnetic recording member such as a wide magnetic belt or a plurality of belts or tapes with picture signals derived from video scanning still image fields recorded in areas which are arranged in aligned columns and rows. The position indicating code may be recorded on a track or tracks as a pulse signal in parallel or series provided on different channels of the tape in place of the image code described, and are reproduced as the conveyor moves relative to an array of reproduction transducers such as magnetic heads replacing said array of photomultiplier tubes. Thermoplastic recording and scanning means such as the so called TPR erasable recording apparatus as developed by the General Electric Company may replace the described photographic recording means in still another system.

Figure 4:
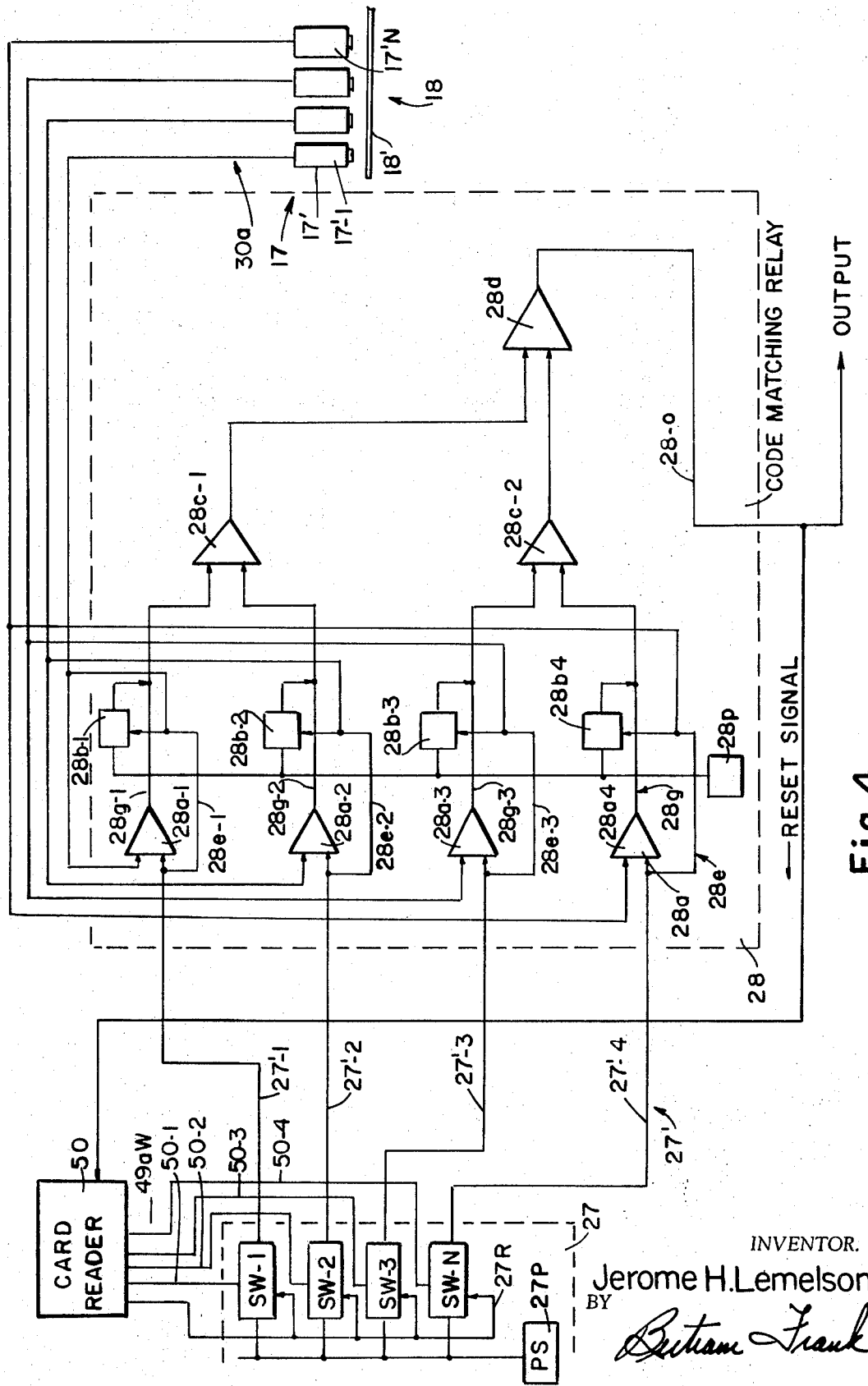
FIG. 4 is a block and schematic diagram of details of a code matching relay utilized in FIGS. 1 to 3.

Details of a typical code matching relay such as those illustrated in FIGS. 2 and 3 and referred to by the notation 28A, 28B and 58, are shown in FIG. 4. The code matching relay 28 employs a plurality of so called logical AND switching elements or the like which are operative to provide an output or control signal when all of the plural inputs thereto are simultaneously energized.

The inputs 27′ to the code matching relay 28 each extend from a respective switch SW which make up the code forming switching bank connected to a respective AND switching circuit 28a. Each AND circuit 28A has two inputs, one connected to a respective switch in switching bank 27 and the other to a feedback input from a scanner of a code reading relay 17′ in said photo-multiplier bank 17 which reads the frame indicating code recorded along the border of the conveyor 18. Thus, if one of the feedback circuits 30a is energized and its matching circuit 27′ is also simultaneously energized, a signal will appear on the output of the logical AND switching element 28a associated therewith.

It is also desired to provide a signal on the output 28*g* of a particular AND switching circuit when there is no signal present on its feedback input 30*a* and no signal is present on its input 27' for code matching purposes. This may be accomplished by providing a normally closed switch 28*b* which will gate a signal from a power supply 28*p* to the output line 28*g* of the AND circuit only when closed, said switch connecting the switching input of said normally closed switch to both of the circuits 27' and 30*a* leading to said AND circuit 28*a* so that if either of the circuits is energized no signal will be passed from said power supply 28*p* to said output circuit 28*g*. As a result of this arrangement, if both of the inputs 27' and 30*a* to the AND switching circuit are inactive, a pulse will be provided on the output circuit of said AND switching unit. Simultaneous energization of all of the outputs 28*g* of said first bank of AND switching circuits 28*a* is an indication that the code set up on the input line 27' by the energization or de-energization of the switches SW is matched or simulated by the respective scanning relays 17'. It is a simple matter to produce a pulse output from said relay 28 when the four or more circuits 28*g* are all energized. This may be accomplished by extending all of the circuits 28*g* to an AND switching circuit having the same number of inputs which provides an output when all of said inputs are simultaneously energized. In FIG. 4 the same effect is accomplished by providing two logical AND switching circuits 28*c*–1 and 28*c*–2 similar to the AND circuit 28*a* each having two inputs which are respective outputs of two of said other AND switching circuits 28*a* and each having an output which extends to an AND switching circuit 28*d* which provides an output on a circuit 28–*o* when both of said inputs are energized. The output 28–*o* is adapted to become energized when the code simulated on the input 27' is matched by the code on the outputs 30*a* of code scanning relays 17'. The switches SW which connect a power supply 27*p*' with their respective output 27' are bi-stable or flip-flop hand operated switches. They may also be mono-stable or bi-stable electro mechanical or electronic switches which become energized and close either when an input 50 to said switch is pulsed. Several modes of operation of the code forming unit 27 are thus possible. The code may be set up by hand by merely activating bi-stable push button switches in the desired code array. Solenoids may also be employed to actuate switches of the selection bank or the inputs 50–1 to 50–4 may be energized by outputs of punch-card reader or any suitable code forming device including a computer. If the switches SW are bi-stable pulse actuated switches they may be each provided with a re-setting input connected to a common resetting line, which when energized, resets all switches to an open state. The signal resetting all of said switches in 27 is derived when the output line 28–*o* becomes energized, said signal being passed directly to the line 27R for resetting 27. If each of the switches, SW–1 to SW–4, are bi-stable switches which close if the respective line 50 from the computer or card reader 50 is pulsed, resetting all switches SW is effected by pulsing a common line 27–R extending to the reset switching input of all said SW switches to activate and open all switches when a pulse is applied to 27–R. Thus, all the output circuit 27' become de-energized as the circuits with 27*p* are opened. The line 27R may be pulsed by a signal generated in the card reader 50 or by feedback of the output signal generated on 28–O to circuit 27–R.

In FIG. 3, the control signal generated on line 28*b*W when the code matching relay 28*b* becomes energized, may be transmitted to all of the resetting switching inputs to the frame selectors 49*a*, 49*b* and 52 to reset all simultaneously in the manner described above.

FIG. 5 illustrates one form of scanning beam control utilizing a conventional video camera modified to scan each image frame only when positioned in the scanning field thereof with a line frequency of 15 kilocycles which may be increased if necessary by replacement of the multivibrators. The generated picture signal comprises that generated during a single frame sweep of the camera read beam and results from a beam sweep which starts at a known point in the image field and terminates at or near said point. Rows of said cameras may be laterally positioned and arranged relative to each other and the image frame conveyor, such that each image frame track moving past said scanners will be scanned by at least one of said cameras. The camera optical system 14*a* is provided such that an image approximately equal to the film, print or micro-photograph positioned in front of said optical system will occupy substantially the scanning field of a conventional image tube 14' such as a Vidicon tube or the like. The camera is provided with the conventional beam deflection and blanking controls 14" which receive sync signals from amplifiers 14*g*, 14*f*, and 14*d*. The blanking amplifier 14*f* receives blanking signals from a blanking mixer 14*b* and the output of an image frame position indicator 17*f*. The frame indicator 17*f* comprises a relay such as a photo-electric scanning unit adapted to become energized and to provide a signal output when it scans a mark on the surface of conveying means 18' which is positioned to produce a pulse each time the forward edge of a row of image frames provided on the conveyor is adjacent the scanning axis of said photo-electric relay. That is to say, whenever an image frame starts to move into the scanning field of the scanner 14, a position indicating pulse is produced by means of the relay 17*f* and said pulse is operative to trigger the deflection chain of the video scanner and to cause said scanner thereafter to scan the selected image field and produce a picture signal on the output 15 of said scanner.

In a preferred arrangement, a photoelectric scanner 17*f* is provided for each row of said video scanners 14 and its output is connected to the input 99 of each scanner in said row, for triggering the scanning beams thereof. This embodiment requires that all document recordings in each row are laterally aligned with the row of cameras scanning means are provided for each scanner 14. If each row of cameras is triggered by a respective scanner 17*f*, precise longitudinal alignment of the rows is not necessary if the position indicating marks or code on the border of 18' are aligned with respective rows of said image frames.

In accordance with the arrangement of FIG. 5 the scanner 14 is provided with three outputs 15*a*, 15*b*, and 15*c*, which respectively pass the horizontal and vertical sync signals and the corresponding picture signal to the switching system 13 through which said signals are gated to the monitor station or stations connected thereto.

The picture signal forming means of FIG. 5 may be utilized in a system employing intermittent motion of the image frame conveyor 18 past the scanning cameras, by utilizing the feed back pulse generated by relay 17*f* to trigger the deflection chain of the camera at a time while the conveyor is at a standstill. Notation 17*fd* refers to a time delay relay in the feed back circuit 17*fw* which delays the output of 17–*f* a sufficient period of time to permit the conveyor to come to rest during its intermittent motion past the camera. A system employing continuous motion of the conveyor belt or flight 18' may also be utilized if the camera 14 is on a movable mount and is moved by means of a lineal servo so that its speed relative to 18' is essentially constant during the interval scanning occurs. The actuation of said camera moving servo may be effected by means of the pulse generated directly on the output of 17*f* before it has passed through said time delay relay. If intermittent motion of the conveyor 18 is employed, the relay 17*f* may be replaced by a limit switch which is coupled to the drive for said conveyor in a manner such that it becomes actuated each time intermittent motion occurs and it is merely necessary to adjust the time delay relay such that the pulse signal created at the output thereof will be transmitted to trigger the deflection chain to 14g and 14c at the proper instant. The picture signal resulting from such frame scanning is developed on the output of video amplifier 14h and with the output of blanking amplifier 14f is transmitted on the circuits of the automatic switching system to one or more of the monitor stations 22. The photoelectric relay 17f is operative to provide a control pulse each time it scans a mark spot 97 printed or otherwise provided on conveyor 18' adjacent each frame and indicative of the position of said frame. Said markers are illustrated in FIG. 9 as being adjacent the beginning of each frame row.

Figure 5A:
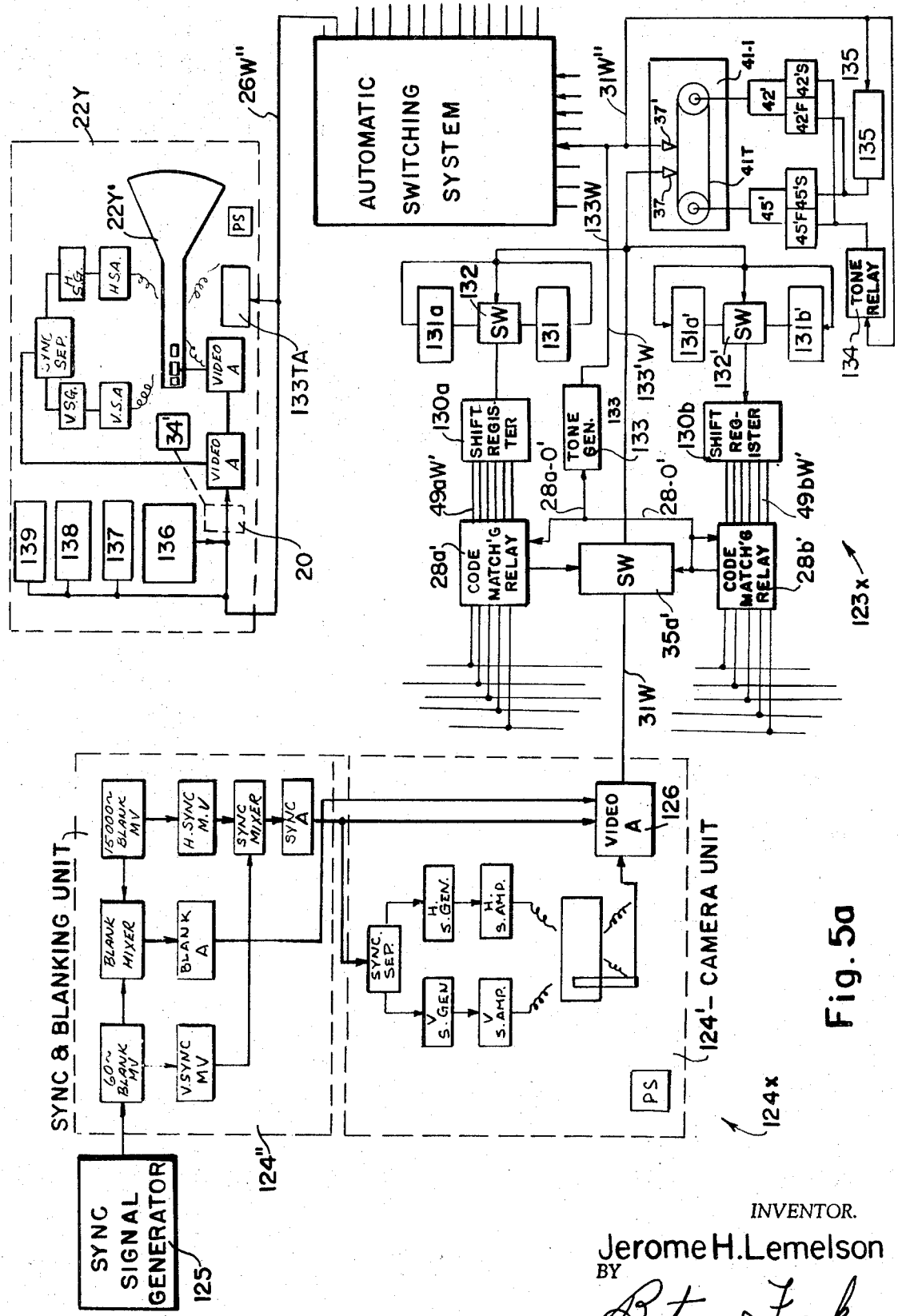
FIG. 5a shows a further modification to a scanner and system as illustrated in FIG. 5.

A modified form of image frame storage and reproduction system is illustrated in FIG. 5a in which composite video signals are generated and recorded at relatively high scanning rate in scanning the storage means for said frames and transmitted at a lower frequency on circuits of an automatic switching system 13P to a monitor station at which the selection of said signals is controlled. In FIG. 5a the camera unit 124x employs magnetic deflection means for its read beam which scans an image screen on which is intermittently cast images of the frames in the column of document recordings being scanned thereby as they pass into the scanning field thereof. The sync and blanking unit 124" is typical of such a unit for a closed circuit television camera of conventional design. The sync signal generator 125 comprises a 60 cycle power line. It may also comprise a photoelectric or other transducing means for reading marks or signals provided on the surface of the conveyor 18' to define row and frame locations such as the markings 97 of FIG. 5. The constants of the illustrated multivibrator will depend on the desired line and frame frequency as well as the other parameters of the system such as the speed and synchronization, of the means driving the conveyor. If the sync signal generator 125 is equivalent to the reader 17f of FIG. 5, then the 60 cycle blanking multi-vibrator may be omitted. If the frames or image fields are mounted on the conveyor with spaces between each which are blank or black such that they will not provide a picture signal at the output of camera 124x when scanned by its readbeam, then the frame blanking generating components of the sync and blanking unit 124" may also be omitted.

The picture, blanking and horizontal as well as vertical sync signals are combined as a composite signal and transmitted from video amplifier 126 in the camera unit over an output 31W to the input of a bi-stable switch 35a' which is controlled to close and open, as described in the embodiment illustrated in FIG. 3, by a pair or code matching relays 28a' and 28b'. The switch 35a' is adapted to be closed only during the interval the camera 124x is scanning predetermined or selected frames of the images passing through the scanning field of 124x.

Since selection of the signals to be passed through 35a' is effected from remote monitor stations such as the illustrated station 22-y and the means for controlling said bi-stable switch are located in the vicintiy of the storage unit beyond the automatic switching system as illustrated, the presetting of code-matching relays 28a' and 28b' is effected by means of signals originating at the monitor stations and transmitted on the connection of automatic switching system 13P over the same line which carries the picture signals to said monitor station. The code matching relays 28a' and 28b' are set-up by means of pulse trains which represent in series the parallel code desired on the inputs 49aW' and 49bW' to preset said code matching relays for document frame selection. The codes destined for each code matching relay are converted from series to parallel codes in respective shift registers 130a and 130b. So that only the correct code will be transmitted to the input of the selected shift register, a switching system employing coded relays and tone responsive relays is employed. Provided at each monitor station is a command code generator 136 which may be a manually operated array of push button switches equivalent in function to the switches SW of FIG. 4 or may comprise a card reader such as 50 of FIGS. 3 and 3a. When code generator 136 is activated after being set up, it transmits a pulse train over its output circuit 26W" on the circuit between switching system 13P and the input 133W to the frame selection control circuits 123x of the selected camera 124x. The command pulse train includes, in addition to a first portion thereof generated for effecting the automatic connection between lines 26W" and 133W, a code portion adapted to energize a first coded relay 131a which effects the closure of a bi-stable switch 132. The next portion of the code generated by 136 is a pulse train which is converted to parallel code after passing to the shift register 30a. Shift register 130a is connected to 133W through switch 132. The output of 130a is a parallel code generated on circuits 49aW and 49bW which is operative to set-up or preset the code matching relay in the manner provided in FIG. 4. The notations 28a' and 28b' refer to the components provided in the boxes 27 and 28 of FIG. 4. The next part of the pulse train transmitted over the completed circuit is adapted to open switch 132 by energizing a second coded relay 131b responsive only thereto. If the switch 132 is adapted to automatically open after being closed a sufficient period of time to permit that portion of the series code to be transmitted to 130a to pass thereto, the relay 131b and the code portion for energizing said relay my be eliminated.

The next portion of the pulse train transmitted from 136 is adapted to respectively energize a coded relay 131'a which is operative to close switch 132' whereafter the desired code is generated by 136 and transmitted to shift register 130b which generated it as a parallel code on lines 49bW for presetting the code matching relay 28b' for determining the opening of the bi-stable switch 35a' when the last selected picture signal has passed therethrough. When the first of the selected image frames enters the scanning field of the camera 124' the bi-stable switch 35a' is closed by the means described and the resulting composite video signals generated as said camera scans the predetermined frames thereafter are gated through 35a' and recorded on a recording tape of an intermediate recording unit 41–1, by means of a recording transducer 37. The closed loop tape 41T of recorder 41–1 is driven at a first, high speed by means of a first servo drive 45' to effect the recording of the relatively high frequency signal transmitted from the output 31W of 124' thereto. After the predetermined composite video picture signals have passed through 35a', said switch opens when relay 28b' becomes energized. The signal on output 28–O' of 28b' is transmitted to reset both of said code matching relays and is passed to a circuit 28a–O' extending to the input of a tone generator 133. Energization of 133 effects the generation of a signal of a particular tone or frequency on a circuit 133'W which includes the connected line extending to station 22-y. The tone signal generated by 133 is used to energize a tone responsive relay 133TA at the monitor station which relay is operative to close a switch and energize a warning device such as a lamp, buzzer or other indicator indicating to the operator of the monitor station that the selected video signals have been recorded on the tape of unit 41–1. The operator may then energize means for effecting the transmission of the recorded video signals from the camera storage unit 123x to viewing monitor means 22–Y' at his station. Notations 137 to 139 refer to controls in the form of tone generating means which may be manually energized to transmit on the connected circuit different control tones for controlling the reproduction of the signals recorded in the storage unit 41–1, and the transmission of said reproduced video signals through said automatic switching system. If the switching system 13P is an automatic telephone switching means employing wire pairs for connections, the video signals recorded at relatively high, megacycle frequencies will have to be generated at relatively lower frequencies to effect transmission thereof on the connected wire circuit. Notation 42' refers to drive means for the transport of the recording tape in 41-1 which is adapted to become operative when drive 45' becomes inoperative to drive the tape at the slow speed for providing the composite video signals reproduced therefrom at the lower frequencies required for transmission over the voice-pairs in 13P.

The means for controlling the speed of the tape 41T of 41-1 comprise in FIG. 5a a first tone responsive relay 135 which, when energized by a particular tone transmitted to its input 31W'' from one of the generators 137 to 139, energizes the stop control 45'-S of servo drive 45' and the start control 42'F of the slow drive servo 42'. The operator may effect this action when the tone relay 133TA and indicator connected thereto becomes energized indicating that the last selected video signal has been recorded on tape 41T. The same function may be effected automatically by connecting the output circuit 28a-O' directly to the inputs to stop controls 45'-S and 42'-S of motors 45' and 42'. If a single frame video picture signal has been recorded on 41T, it may be reproduced therefrom and transmitted to 22-y over circuit 26W'' and passed directly to the video storage tube 22-y'. If a plurality of signals have been recorded in 41-1 they may be individually reproduced when needed and used to modulate the writing means of storage tube 22y' or may be passed in series to the intermediate storage system 20, operative as described whereafter individual frame signal selection means 34' may be manually operated to effect image generation at the will of the operator by modulation of the writing means for the storage tube 22-y'. It is noted that recording apparatus 41-1 at the camera may also be provided with individual signal selection controls of the type provided in U.S. Pat. 3,051,777 which are manually operated and remotely controllable by a tone responsive or coded relays. Such relays may be controlled from the monitor station 22-y at the will of the operator who activates manual switches controlling tone or code signal generators. This arrangement will eliminate the need for further intermediate storage means such as 20 at each monitor station.

Further variations in the apparatus of FIG. 5a include the provision of automatic erasure means for the signals recorded on tape 41T, which erasure means may be energized as the signals are individually reproduced or may be controlled by the operator of the monitor station by means of manually operated tone or code generating means located at the monitor station and adapted to energize a relay responsive to the signal generated thereby which relay is coupled to energizing means for the erase head. A further feature may include means for automatically uncoupling the output of video amplifier 126 from the monitor station to another circuit 31W at the end of a selection cycle so that the camera output is available to another subscriber or monitor station. A solenoid stepped rotary switch in the circuit 31W may effect such uncoupling by connecting the solenoid to the line 28-O' so that when the bi-stable switch 35a' opens when the selected signals have passed to the monitor station, the output of 124' will be available for transmission to another monitor station. Notation 134 relates to a second tone or code responsive relay activated by a signal transmitted from one of the generators 136 to 139 to start the drive 45' by energizing the forward drive control 45'F and the stop control 42'S of drive 42'.

Also illustrated in FIG. 5 are details of a typical station video monitor. Station 22-x is illustrated having a video picture or storage tube 22', the picture writing means of which is operatively connectable either directly to the outputs 15 of the video camera 14 or to the intermediate storage apparatus which in turn is connectable to said camera outputs through said automatic switching system 13. The circuits 15a, 15b and 15c extend by means of connecting circuits in automatic switching system 13 to monitor station input circuits 15a', 15b' and 15c' after passing through respective gates represented by the block 13', which gates are activated by signals provided by the code matching means 28 shown in FIG. 3 which is part of the frame and circuit selection apparatus. The selected picture signals arriving on circuits 15a', 15b' and 15c' are recorded on respective tracks of the magnetic recording member comprising the intermediate storage apparatus 20 and may be selectively reproduced therefrom a frame at a time for providing respective images on the face of the tube 22'x' as described in my Pat. No. 3,051,777.

It is noted that the camera 14 of FIG. 5 may be a flying spot scanner or other type of beam modulate video scanner. If said scanner is a flying spot scanner, the photoelectric receiver for the modulated light thereof may be positioned on the other side of the conveyor flight or belt 18' from the light source in alignment with the stored image frames F developed in transparent film. The output of the receiver, which may comprise a photomultiplier tube will comprise picture signal line 15c while the vertical and horizontal sync signals are derived from the sweep and blanking unit controlling the beam of the scanner in its raster scan as described.

It is further noted that the apparatus of FIG. 5 may be simplified by providing a common sync and blanking unit such as 14SB adapted to generate vertical, and horizontal sync signals as well as blanking signals for a plurality of scanning cameras such as all of the scanners provided in one of the lateral arrays or may provide beam deflection signals for all of the cameras in the system by providing the outputs of the vertical synchronizing signal amplifier 14g, the blanking amplifier 14f and the horizontal synchronizing amplifier 14d of a sweep and blanking unit operatively connectable to the inputs of all selectively operating cameras in the storage and reproduction system. All camera scanning beams will thus operate in synchronization with each other and each camera will produce a picture signal on its output at substantially the same time the other cameras are generating picture signals. This will require that all stored image frames provided in lateral array be aligned such that each will simultaneously enter the scanning fields of a respective camera in said lateral array of scanners. Longitudinal alignment of all rows as well as their spacing relative to each other will necessarily be the same for all rows of document recordings in such an arrangement. A single scanner such as 17f may thus be used to trigger the deflection chain of the common sweep and blanking signal generator. If intermittent drive is employed for the conveyor, the trigger signal may be derived from a limit switch on the shaft of the drive adapted to close and generate said trigger pulse when the conveyor comes to rest.

FIGS. 6 to 8 show constructional details of the image frame storage conveyor and the means supporting said plural rows of video scanning cameras. The housings of the video cameras are shown secured in side-wise abutment with each other in row formations with each row of said cameras being supported by a respective crossbeam 76 provided in the form of a channel which is supported between longitudinal beams 71 and 71' forming the upper structure of a box frame 70 which extends to the side of and above the closed loop conveyor 18. The box frame illustrated is made of pairs of end vertical beams 73 and 74, a pair of lower longitudinal beams 75 which are supported by the floor, upper longitudinals 71 and 71' and respective lateral beams, one of which 72 is shown in FIG. 6. Since a smaller television camera available at this writing measures about 1½ x 1½ inches in cross-section, in order to obtain maximum image frame storage density on the conveyor to provide scanning axes less than ½ inch apart, the requisite camera spacing is provided in FIGS. 6 and 7 by providing multiple rows of cameras and staggering the positions of the cameras in one row with respect to those of the other rows. If the walls of all camera housings are of the same dimensions and the optical systems of each camera, is similarly provided in position in all cameras, then the distance between each camera's scanning axis, when said housings are in abutment with each other, will be equivalent to the width of the housing. As an example, if the camera housings are 2 inches wide and the distance between center lines of each column of storage frames or images on the conveyor 18' is ⅜ inch, then each camera in a bank will scan a column of image frames which is eight columns away from the column scanned by the adjacent cameras. By staggering each row of cameras so that it is shifted in lateral position from the adjacent or next row in line a distance equivalent to the distance between columns of image frames, then eight rows of said cameras, each of which extends completely across the image area of the conveyor, will suffice to scan all columns of image frames on the surface of the belt 18.

Further structural details of the mount for said cameras include the provision of means for supporting such components as bearings for the shafts of the conveyor drive and idler means, the drives for said conveyor and the coaxial cable and wires extending to the individual cameras. The longitudinal and lateral beams 71, 72 and 76 are provided as I-beams or channels opening upward as shown so that said cable, referred to by the notation 15–W, may be placed in the track or channel provided by said beams and will be supported thereby in extending to the various connection points along the lateral beams where they are connected to respective cameras. The wire bundle 15WB of each channel extends to longitudinal channel 71' where it joins and extends with bundles of other wires from cameras of other rows and forms a larger bundle 15WB' which extends along 71' to near one end thereof from which it extends to said automatic switching system or as individual wires to respective remote locations or monitor stations. The lateral beam 81 supports the described bank of code scanning photomultiplier tubes 82 which scan the border area 18'C of said conveyor containing said position indicating code. The drums 86 and 87 are shown respectively supported on bearing mounts 88 and 89 which are supported by extensions of the frame 70 or by the longitudinal 75 and 75' thereof at the bottom of the frame. The drum or sprocket 87 is driven by a motor 78 mounted on the end of the frame 70 through a belt 85. A plurality of free wheeling rollers 89 are supported in bearing at the ends of respective longitudinal beams, one of which 83 is shown, which extend between end verticals of the frame. These rollers support the belt 18' of the conveyor in precise vertical alignment relative to the cameras so that the image frames will not be out of focus when projected on the scanning screens of the cameras.

In order to permit lateral adjustment of each camera, the base of each channel 76, against which the end of each camera is mounted by means of screws, is provided with a series of slotted holes 76S therein which extend in at least two rows along the length of each channel. If the length of each of said slotted holes 76S is equal to or greater than half the width of each camera housing, then the desired lateral adjustment of all rows may be effected and said beams may be interchangeable with each other. If an individual camera should have its circuit components burn out, it may be easily removed and replaced by another camera by making the connections between the wires 15W and said cameras pluggably connectable with each other.

FIG. 8 shows further details of a camera and mount in the system illustrated in FIGS. 6 and 7. Secured at both ends of the longitudinal upper beams 71 and 71' of the frame is a lateral channel beam 76 which is provided with angle brackets 77 at both ends, which are secured by bolts to the upper beams of frame 70. Slots 71a, provided in the inner sidewall of box or channel beam 71, permit longitudinal adjustment of the crossbeam 76. Such elongated slots preferably extend the length of the lateral beams. Centrally located slots 71c in the inside wall of 71 permit the passage of the wires and video cables therethrough from the interior of the beam 71 to the interior of the cross-channel 76 and the extension of said wires to their respective cameras and controls. The cable 15W, extending along channel 76, may be strapped to the sidewall thereof or merely deposited therein said cable is shown extending over the edge of the side wall of 76 from which it extends downward to the top of the camera housing 14H. The cable 15W is preferably connected to the camera by means of a multiple pole pluggable connector 15WC, one half of which is secured to the end of 15W and is adapted to plug into a recepticle secured to the housing so that said camera may be easily removed and disconnected, and replaced by another camera in the event that it should not function properly. All that is required to replace the camera is to remove bolts 76B which extend through the base of 76 and thread into threaded holes in the top wall of the camera housing 14H which abuts 76 as illustrated, and to disconnect the pluggable connector 15WC.

Also illustrated in FIG. 8 is a light source 14LS in the form of an electric light mounted in a housing 14L at the side of the scanning aperature or lens 14–O for said camera. A lens or lens system employed in the housing 14L preferably directs light to illuminate the column being scanned sufficiently to derive the desired degree of illumination for proper scanning.

FIGS. 9 and 10 illustrate design details of a conveyor for the storage frames. Said frames may be mounted on or be part of a flexible conveyor belt or belt-like closed loop structure which may also comprise a plurality of flights 92 or plates arranged in a closed loop or otherwise, referred to as 90.

In FIG. 9, a fragment of a plate or flight 92–1 is shown and is preferably made of metal of sufficient stiffness to prevent its deformation during conveyance past the cameras. The edge view, of FIG. 9 provided in FIG. 10, shows plural brackets 92b secured to the opposite face of the flight. Said brackets are pinned to a closed loop link or chain conveyor 91, which conveys the plates in a tandem array and along a fixed path in a plane at essentially a fixed distance from all cameras. The member 92 may also comprise a closed loop of 1/16 to 1/40 inch thick sheet metal such as stainless steel adapted to be driven around a plurality of guides or pulleys.

A first border area 96B of the flight 92–1 is adapted to be engaged by plural rollers or guides 83'a which are rotationally mounted on the frame adjacent the conveyor and urge said flight against rollers or guides 83'b engaging the other face of the flight preferably in alignment with said opposite face engaging rollers. These rollers maintain the flight in the desired plane. Lateral alignment of the flight is effected by means of edge riding rollers 83" which engage both lateral edges of the flight as it is drawn along by means of the chain which is driven and guided by conventional means over a plurality of pulleys or drums in a closed loop path.

The edge view, FIG. 10, shows the lateral guide rollers 83", as being centrally recessed so that the plate rides in said recess and becomes centered and fixed in position relative to said guide members positioning the image frames thereon in predetermined longitudinal alignment relative the respective video scanners.

All rollers are preferably spring loaded against the plate or flight so that the flight is effectively guided and is kept in lateral alignment as well as substantially level and at the same height as other flights guided therethrough.

Inward of the border area 96B of the plate is a strip area 96B' which extends the length of the plate and has provided thereon by means of printing, scribing or other means, an elongated code strip 96 such as a binary-code provided for positional indication of frame or frame row or lengths of said conveyor adapted to be scanned. The code on strip portion 96 is divided into and changes at fixed intervals of length of said conveyor which may comprise the length of each frame or a fraction thereof to allow for cross referencing information to be entered as parallel codes.

Inward of the code strip-area 96 are provided a plurality of marks or indentations in the surface of said plate in the form of laterally extending straight lines 95, which are precisely provided at right angles to plural longitudinal lines 94 for aligning strips or columnar formations of frames of image information which are provided on film, paper, plastic mounted per se or on a metal backing sheet. Said frames, for maximum conveyor area utilization, are preferably in the form of micro-image photographs having an area of less than ½ square inch each or less. Depending on the precision of the optical systems of the cameras and the resolution required of the reproduced image, strip areas or frame reductions from standard letter size sheets or photographs to recording areas which are 1/10 inch square or less per document may be employed. Lines 95' provided on the border of each frame are adapted for alignment with lines 95–1 to 95N on the conveyor 92 which extend laterally thereon and longitudinally extending lines 94' along one border of the image strip or frames are adapted to be aligned with the longitudinal conveyor lines 94–1 to 94–N to align said frames.

Whereas in FIG. 9 the notation 92–1 refers to a plate or flight which is shown in FIG. 10 as being secured with others to a conveyor chain and driven through the guide means by driving said chain, it is noted that said plate or sheet may be one of a plurality of individual plates or sheets which are not joined together but are individually handled and fed through the illustrated guide means and driven therethrough by motor means driving two or more of said illustrated pairs of guide rollers.

A plurality of parallel lines, referred to by the notations 94–1 to 94–N may be scribed or otherwise provided on the surface of the conveyor and extend in a longitudinal direction thereon for longitudinal alignment of image frames, columns of said frames or ribbon-like formations of multiples of said columns by aligning border lines or marks provided on said frames by printing or photography means. When said alignment is effected, the associated column or columns each are positioned to pass through essentially the center of the scanning field of their respective scanning cameras. Lateral alignment of each frame is provided by means of parallelly extending lateral lines 95–1, 95–2 etc. provided across the flight 92–1 with which lines or marks each frame or strip-group of said frames are adapted to be aligned and are positioned in the longitudinal direction such that, when frames or strips have their position indicating marks aligned therewith, said frames will each be centered in the scanning fields of their respective cameras after they enter said field and the conveyor comes to rest for performance of the said scanning function. For continuous operation of the conveyor in which continuous line scanning is employed with the constant-speed movement of the vertical deflection means for said scanning, the alignment lines 95 serve to position rows of said frames relative the border code-strip 96 whereby each unit length of said code will be associated with a particular row of frames and to furthermore effect the alignment of said frames in lateral rows across said conveyor.

The flight 92–1 may be one of a plurality of said flights 92 which are hinged or otherwise pivotally mounted relative each other, preferably provided on a chain mount and drive means as shown and arranged in an open or closed loop adapted to move said plates at constant speed or intermittently at a constant rate with frames in respective columns simultaneously entering and leaving the scanning fields of respective of said scanning cameras or the like as described. The notation 92'–1 refers to that portion of flight or plate 92–1 which does not have said columns of image frames or pictures mounted thereon and illustrated the lateral and longitudinal extensions of the lines 94 and 95. The lateral lines 95 are shown provided every plural number of frame lengths along 92–1 although they may be provided and repeat every frame position thereon. The notation 97 refers to the described frame indicating marks which are adapted to be scanned and provide read-beam trigger pulse output signals by activating a photoelectric scanner, for frame start-reading trigger functions as described.

FIGS. 11 to 15 illustrate constructional details of the image frame conveyor flight 92 including means for simplifying the alignment of image frames thereon in column and row formations. The image frames are shown as provided as single units although they may also include strips of single or multiple colums said frames which are prepared, preferably by photographic or printing means and are secured to predetermined areas of the conveyor so that automatic selection means may be employed for scanning selected recordings.

Figure 11:
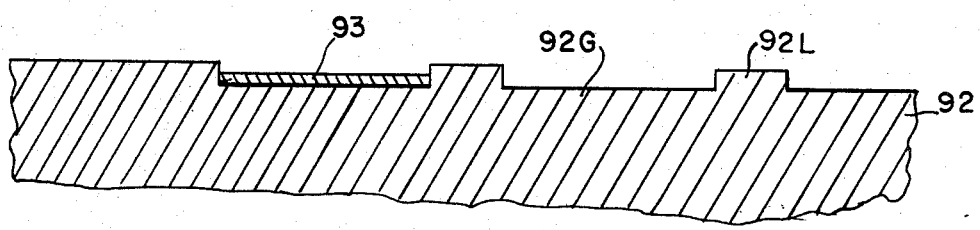
FIG. 11 is a partial view in lateral cross section of part of the image frame conveyor of either FIG. 8 or FIG. 9; showing means for mounting a plurality of image frames thereon.

In one form the conveyor flight comprises a flat rigid plate having frame position indicating lines scribed or otherwise provided on the surface thereof on which said image frames are to be secured to provide alignment and prepositioning of said frames. A flexible belt is utilized for said conveyor, the belt may comprise stainless steel sheet metal having frame alignment marks provided on its surface as described. In FIG. 11, the flight or plate 92, shown in lateral cross-section has a plurality of parallelly extending grooves or channels 92G provided by milling or other means in the upper surface of said plate, each of which channel is approximately equal in width to the width of a single film-strip of image frames or to multiple columns of frames. The walls of the grooves thus serve as means for aligning strips therein which may be adhesively retained or secured with small screws to the bottoms of the grooves. Lands 92L are provided separating adjacent grooves and preferably run the length of the flight or a sufficient portion thereof to afford wall portions for alignment of said frame strips 93.

Figure 12:
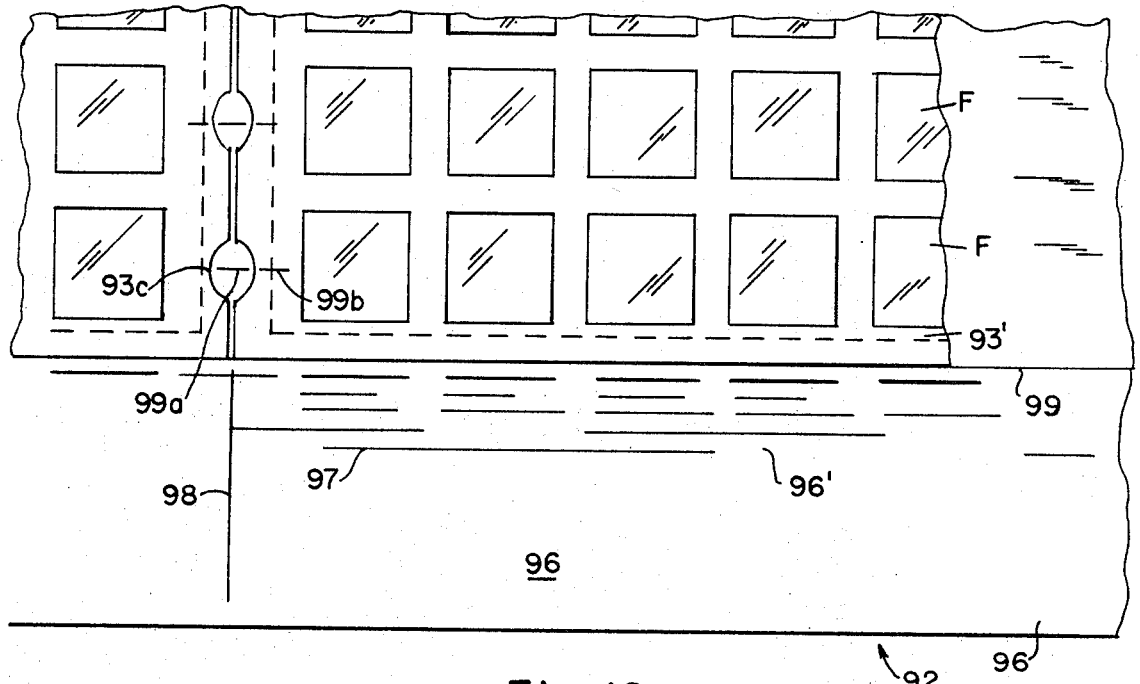
FIG. 12 is a plan view of a modified image frame mount or conveyor.
Figure 13:
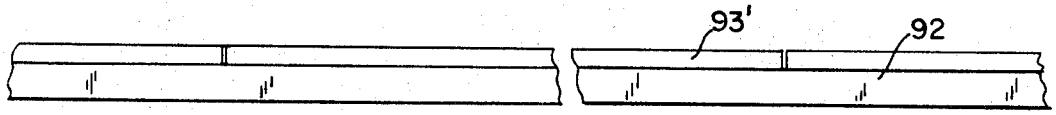
FIG. 13 is a side view of FIG. 12.

In FIG. 12, the sheet 93' contains the document recordings as plural columns F of photographic images developed in single strips of film. The choice of whether to utilize single columns of recordings or multiple columns will depend on the characteristic of the information being stored, how often it will have to be updated, replaced or changed and the characteristics of the selection and coding system employed.

Image frame alignment means in FIG. 12 comprises utilization of lateral lines 98 across the flight member 96 to define the location of the lateral edges of image frames F and plural longitudinally extending lines 99 and 99a scribed or otherwise provided on the surface of 92 for indicating the longitudinal alignment of columns of said image frames. Line 99, if the edges or borders of the film strips are precisely provided relative to the frames thereof, may be used during mounting or image development to align said strips laterally on 92. If film strips containing single columns of said frames are to be mounted or otherwise provided on the base, position indicating lines 99a spaced across the base and defining the centerlines of the fields scanned by the scanning cameras, may be provided for automatic or manual alignment of film strip with lines 99b provided at the center of each image column or filmstrip. The notation 93c refers to a cut-out in the edge of the filmstrips permitting the line 99a to be scanned or viewed from above. If the film strip is a transparent sheet of photographic film, said cut-out will not be necessary.

Lateral alignment of a plurality of said film or image strips may be facilitated by providing said lateral alignment lines 98 also on the surfaces of each land portion 92L so that individual strips placed in the adjacent grooves may be aligned without having to use a straight edge. Notation 96 refers to the border area of the plate 92 which is flat and contains printed photographic or otherwise provided marks thereon in the form of a strip code 96' extending as code increments along the length of said flight for identifying unit incremental lengths thereof on which specific rows of said frames are provided and for cross-indexing. Area 96 may also contain magnetic recording material to be recorded on and reproduced from by transducing means positioned off the conveyor.

Figure 14:
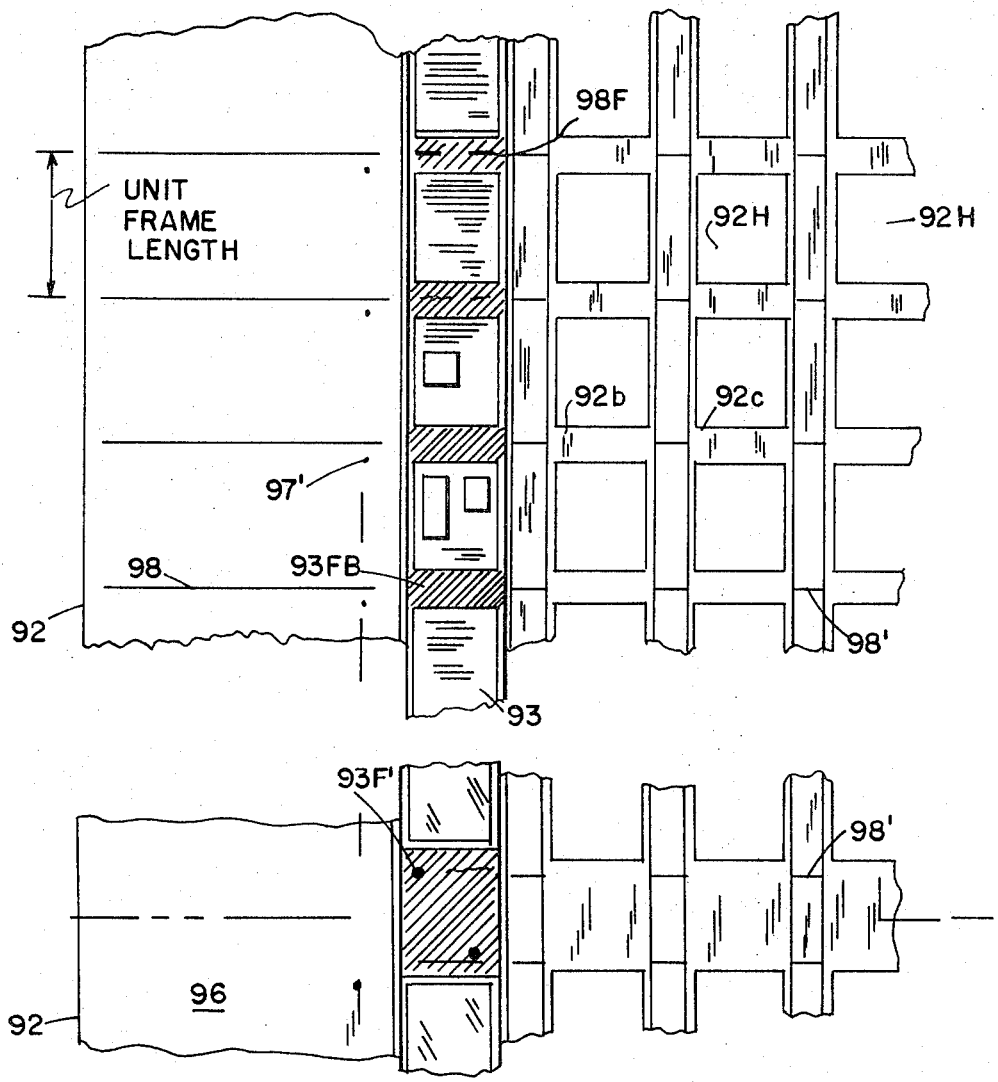
FIG. 14 is a partial plan view of another form of image frame conveyor and mount.
Figure 15:
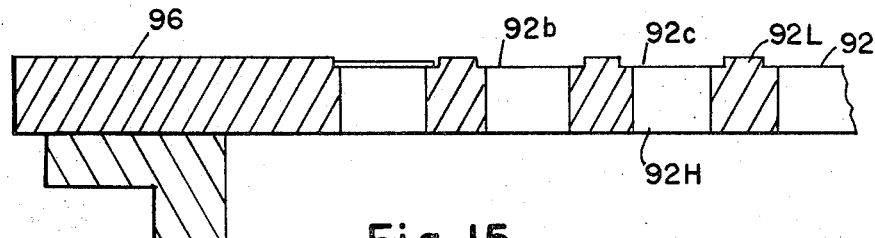
FIG. 15 is a lateral cross sectional view of FIG. 14.

FIGS. 14 and 15 illustrate constructional details of a conveyor for said image frames which are mounted thereon in strips of one or more columns of said frames such as the strip 93 shown. The coveyor or platen 92 is shown as having a series of indentations or channels 92a, 92b, etc., provided in its scanned surface into which strips of film or micro-image developed transparencies are placed and secured. The width of each channel is essentially equal to the width of the film to be mounted therein so that the side-walls thereof may serve as guides for aligning said strips. A plurality of slotted holes or cutouts 92H are provided in each channel base, if it is desired to pass light through the film for scanning purposes. Although the holes 92H illustrated in FIG. 14 are shown as extending just the length of each image frame, they may also be provided extending multiples of said frame lengths. Light may thus be passed completely through said film from below or above in the manner described hereafter. Scanning is effected by means of a flying spot scanner or the combination of a stationery light source on one side of the conveyor and the use of a receiver or camera on the other having its scanning means in alignment with said light source and said column. The lands 92L between channels provide the lateral wall support for the strips of image bearing film. The upper surface of each land is shown with a scribed line or mark 98' thereon for aligning the frames of said film. Alignment marks 98F between frames in a strip which define the end-limits of each frame are adapted to be aligned with the lines 98' when said image frame is properly mounted or recorded thereon. Cement may be applied to the base portions remaining between cutouts 92H for adhering the film strips thereto frictional means or small screw fasteners may be used to effect said holding function. The fragmentary view at the bottom of FIG. 14 shows portions 92b of greater length than the corresponding remaining portions 92a with fasteners 93F' securing the image strip 93 thereto. The lines 98 extending across the border code area 96 of flight 92 are extensions of the lines 98' and define the limits of the strip binary code units to be provided on 96. The notation 93FB refers to black portions of each film strip between frames adapted to be scanned and provide the blanking portion of the vide signal. Notation 97' refers to marks along a particular track or strip area of 92 adapted to be scanned by a photoelectric device, such as 17f of FIG. 5, to provide the frame vertical sync pulse in the resulting picture signal and to trigger the vertical deflection chain of the camera as described. FIG. 15 shows further details of the flight construction and also illustrated a bracket 92b for supporting 92 on said conveyor therefore.

Whereas a number of the image frame flights or plates of FIGS. 11 to 15 may be secured together to define a conveyor having a flexible closed loop arrangement if flights in accordance with the assembly means of FIGS. 9 and 10, a plurality of said mounting plates may also be provided as the storage means for said frames, which plates are unattached and are stored by stacking either vertically or horizontally and fed, one at a time, either selectively or in a predetermined order through a guide means such as illustrated in FIGS. 9 and 10 which prepositions said plates and effects their prepositioning and individual alignment relative to one or more scanning cameras which are fixedly mounted relative said plate guiding means. The feed of said unattached plates may be effected by conventional sheet feed means to said guide means of FIGS. 9 and 10 wherafter the driving of each plate through said alignment means may be effected by the frictional engagement of one or more drive wheels against the undersurface of the plate adapted to be driven by a powered drive means or servo at a constant or intermittent movement as described.

Since all of said rollers are provided with opposed rolling depressor means and are spring loaded to frictionally engage the plate after it enters said guide means, the continuous or intermittent drive of said rollers by means of a chain and sprockets or by means of gears driven by a constant speed motor or stepping motor, will effect the continuous or intermittent drive of said plate. The drive will depend on the type of scanning and will be in accordance with the teachings of this application whereby individual rows of said frames will move into and out of the scanning fields of respective cameras as described. The plate or sheet 92 may be a sheet or card, with or without punchings provided therein for automatic sorting and selection purposes. Known methods of getting, feeding, collating, selecting and sorting punched cards may be employed to select, preposition and feed individual cards to said guide means and to receive, convey and store said cards therefrom. A further improvement involves providing the guide and drive rollers 83' having sprocket wheels secured thereto or as sprockets adapted to have their teeth engage in punchings provided equispaced on the borders of said cards for longitudinal alignment in said guide means and for driving each card therethrough whereby the individual frames will be respectively prepositioned in the scanning fields of respective cameras when scanning is effected. The spacing between border punchings or cutouts engaged by said sprocket drive teeth may be equivalent to said unit frame length FL permitting said cutouts to be used for frame alignment purposes and simplifying the means for controlling the movement of said drive sprockets. A columnar area of said card may be provided for containing, in addition to said position indicating code or the like, or as a supplement thereto, rows of punchings in the form of a code or codes adapted for selection and storage of the card by conventional punched card sorting and selection means.

FIGS. 16 and 17 illustrate further modifications to the image storage and picture signal reproduction apparatus hereinabove described and includes means for scanning image frames by means of reading beam movement across a column of said frames whereby scanning in the longitudinal direction is accomplished by constant speed movement of the image frame conveyor. In other words, the conveyor or flight on which document frames are mounted moves at constant speed while video scanning proceeds either with a free-running beam or one deriving line or frame sync pulses from scanning line or frame indicating marks along the border column of the conveyor. Said scanning provides a continuous picture signal of the image recordings which is actually a plurality of individual picture signals one for each frame scanned, and all generated in a tandem chain and derived from scanning the different image frames as they move relative to the scanning means. Only those selected individual picture signals which are predetermined portions of the resulting picture continuous signal derived from scanning the column of image frames are gated to the monitor stations in the system by the means described.

In FIGS. 16 and 17, conventional television cameras is heretofore described and used for scanning the document image fields, are replaced by a system employing a flying spot scanner of the cathode ray tube type which provides a moving light source projecting a beam of light through the transparent film images as they pass the scanner, said light being modulated in intensity as it passes through the transparent image fields and is picked up by a multiplier phtotomultiplier tube. The output of the photomultiplier tube is transmitted as a picture signal to the receiving station and stored or used at once to modulate the picture writing means at said station.

Notation 114 refers to a scanning device which includes a flying spot scanning tube and an objective lens system. Notation 116 refers to a housing containing a photomultiplier tube and a condenser lens system. The image storage system of FIGS. 16 and 17, includes in addition to other features heretofore described for operating the conveyor and conducting the generated signals to monitor stations at least one flying spot scanning unit such as 114 aligned with each image storage column of the constantly moving conveyor 18" and an associated photomultiplier tube 116 positioned to receive light from said scanner after it has been intensity modulated in passing through the image frames passing between the two. A side-by-side array of said scanners is shown provided in a lateral row all of which are mounted on a common cross-member 106 which is supported by the described box-like frame of beams referred to in FIG. 16 by the notation 100. If the width of the image frames or columns of information is such that the closest spacing of said scanners 114 will provide scanning of only multiple frames or spaced-apart frames, staggered rows of scanners may be provided such as in the arrangement shown in FIG. 7, each row of scanners being provided on a different cross-beam 106 and aligned with a respective row of said photomultiplier receivers 116 provided below the conveyor flight 18"-c on respective crossbeams 120 which are supported by longitudinal beams 109 at each side of the frame 100 which extend between verticle beams 102 located at the corners of said frame.

Power and deflection control lines 115 extend along each top cross-beam 106 to respective scanners 114. For effecting economy in construction the illustrated apparatus, all or groups of the flying spot scanners may be collectively controlled whereby the deflection beams of each are simultaneously caused to scan their fields by signals generated in a common signal generator having an output which feeds the deflection circuits of all or a plurality of scanners. A block diagram of the picture signal generating means of such an arrangement is illustrated in FIG. 17. A single line deflection synchronizing signal generator 121 is provided having circuits similar to the horizontal scanning sync signal generator and line blanking signal generator used in conventional television horizontal and blanking sync signal generation. The generator 121 is shown feeding the deflection control circuit of the flying spot scanners 114 as well as the final stages of the picture signal amplifiers of each photomultiplier receiver 116 in a particular row of said scanners. The output of the photomultiplier tube 116 is proportional in amplitude to the intensity of the light received by said photomultiplier from its respective flying spot scanner after passing through the film of its respective column. Said output is passed to an equalizing amplifier 123 the output of which is fed to a clamping amplifier 124 wherein the respective horizontal sync signals are combined with the picture signal, the former being generated by the sync signal generator 121. The output of 124 is passed, as a series of picture signals derived from scanning respective frames as they pass through the field of their respective scanners and said picture signals are combined with blanking and horizontal sync signals and fed to the switching system 13 described. Means as heretofore described, may be used for selectively gating only those portions of the picture signal generated by scanning selected frames of the column of document images conveyed past the selected scanner.

In operation of the apparatus of FIGS. 16 and 17, light from the illuminated spot on the face of the flying spot scanning tube is focused on the image in the film and is modulated in passing therethrough according to the degree of transparency of the image being scanned. The modulated light is focused on the multiplier phototube by a condensing lens system and the output of 116 constitutes the video signal. Single line deflection is utilized with the circuits similar to horizontal scanning in conventional television and the beam is thereafter adapted to quickly return to a start scanning position after reaching the end of each line sweep, during which interval the beam is blanked. Reference is made to apparatus described in the March 1949 issue of RCA Review for a description of a continuous sweep flying spot scanner operative to scan a continuously moving film-strip and applicable to the apparatus of FIGS. 16 and 17. Line frequency may be adjusted from 6 to 16 kilocycles and will depend on the speed of the conveyor 18" and the desired degree of resolution of the resulting image generated on the face of the monitor screen.

If conventional video storage and reproduction apparatus are utilized to reproduce an image on the face of a cathode ray tube or the like by the means described in U.S. Pat. No. 3,051,177 both line and frame vertical sync signals will have to be added to the resulting picture signals generated by the photomultiplier tube 116 at some point after their generation or provided in the proper synchronized relation to the picture signal at some point in the system prior to its utilization to modulate the beam writing means for monitoring the image of the picture signal. In FIG. 17, a photomultiplier tube or the like 126 is provided which scans marks 97' on the border of the conveyor 18" and is adjusted to provide a signal output whenever a mark appears in the scanning field of said tube. If said marks or points or different light reflectivity are positioned such that the image of each will enter the scanning field of 126 when the leading edge of a respective image frame or row of frames enters the scanning field of a video camera or scanner 114, then the pulse output of 126 may be recorded as the frame vertical sync signal or used as means for triggering a vertical sync signal generator to provide future vertical deflection control for the selected picture signal. The output of 126 is shown connected to the output 15 of amplifier 124 for the signal generated by 116 as well as to the outputs of the amplifiers associated with the other photomultiplier tubes 116 of a row or all those in the storage system so that said sync signal is combined and transmitted with the video picture signal in correct synchronization such that it may be used as the frame vertical sync signal. The notation 127 refers to a vertical sync signal generator of conventional design which may be inserted between the output of 126 and the line 15 or all outputs for the photomultiplier tubes 116 of a row or system which generator is triggered by the signal produced by 126 and combined with the video signals to provide the necessary vertical sync signals for modulating conventional video beam writing means. Said generator 127 may also be provided at each video receiver or may be operative to provide frame vertical sync signals on all scanner output lines simultaneously. The notation 117 of FIG. 16 refers to the individual lines extending from each photomultiplier 116 along the beam support 120 to the longitudinal beam 109 from which all said lines extend to the described switching system. Similarly, the lines 115 extend along upper longitudinal beam 108 from a common power supply and sync signal generator to each flying spot scanner 114. Notation 17' refers to the mentioned bank of code reading photomultiplier tubes secured on a mount 17a to the crossbeam 106. Output lines thereof extend along 108 to respective inputs to the switching system.

The conveyor belt 18' may comprise an elongated magnetic recording medium such as a wide magnetic recording belt or a plurality of belts or tapes with picture signals recorded in columns and rows thereon onto predetermined strip areas thereof for selective reproduction by the means provided by use of a plurality of the correct reproduction transducers. Furthermore, the positional code producing photoelectric reading bank of relays 17 of FIGS. 1 and 17 may be replaced by one or more magnetic reproduction transducers adapted to scan one or more magnetic recording tracks provided on a magnetic recording strip area of the belt or flight on which is recorded a plurality of signals which are indicative of the position of the belt. The provision of a parallel binary code thereon adapted to be reproduced and provided in essentially the same areas as the illustrated visual code, would serve the same function as said visual code when magnetically reproduced therefrom.

A further variation in the means for scanning and storaging image signals may utilize the physical arrangement illustrated in FIG. 16 which employs document image frame developed in thermoplastic recording photographic film. Direct lighting and scanning of the image field may be employed as illustrated in FIGS. 5 and 6 in which the cameras scan positive prints ripple pattern thermoplastic recordings or film mounted on a white background. If micro-images developed in photographic or thermoplastic recording film are employed, a preferable method for providing said images at the scanning plane of the cameras is to pass light through said film in a manner to project the images formed by said light onto the scanning field of the camera. In this arrangement, the housing 116 contains mounted thereon the required light sources and optical means for projecting said light whereby it passes through the column of images 93 and is then passed to the camera lens system whereby it forms an image on the scanning screen thereof. For this arrangement, the housings 116 would all be light sources and the scanners 114, video cameras having the necessary optical scanning means provided with each. The video picture signal outputs of said cameras would be connected as illustrated in one of the circuits heretofore described.

What is claimed is:

1. An information storage and retrieval system comprising:
   (a) a master information storage station having means carrying recorded information,
   (b) signal input and output means for two-way communication with said master information storage station,
   (c) reading means for scanning said recorded information and converting same to electrical signals, and means for generating said electrical signals on said output means of said master information storage station,
   (d) first control means operative to cause said reading means to read selected information recorded on said information carrying means of said storage station,
   (e) a plurality of monitor stations each having a visual display means for displaying information,
   (f) an erasable signal recording means associated with the means displaying information at each monitor station for electrically energizing said display means to generate and retain a pictorial presentation of the information transmitted from said master information storage station,
   (g) a plurality of communication channels for signal communication between said monitor station and said master information storage station,
   (h) a plurality of second control means including at least one associated with each monitor station for selectively effecting a communication link between the associated monitor station and said master information storage station through one of said communication channels so as to estabish two-way communication between the monitor station and said master information storage station,
   (i) third control means at each monitor station for selectively controlling said first control means to cause said reading means to read selected information from the means carrying recorded information and to effect the transmission of selected information signals from said master information storage station to the monitor station from which said selective control is effected, and
   (j) means at the monitor station for receiving the information signals transmitted thereto from the master information storage station and applying said signals to the erasable recording means of the monitor station to permit the information to be displayed by said display means.

2. An information storage and reproduction system in accordance with claim 1 whereby said monitor means at said monitor stations each include respective video storage means each having a display screen and means for writing information on said display screen as an image, said erasable recording means including means for storing the information displayed and means for retaining the image on said display screen for an extended period of time.

3. An information storage and reproduction system in accordance with claim 1 whereby said monitor means at said monitor stations comprise respective video storage means each having a cathode ray image storage tube with a display screen and a write beam for generating storage image information on said display screen, and means associated with each video storage means for modulating said write beam in accordance with the signals received from said master information storage station to provide images on said display screen which images are representative of the information transmitted from said master information storage station.

4. An information storage and retrieval system in accordance with claim 1, said erasable recording means including means for recording a plurality of information signals received from said master information storage system and further means for selectively reproducing each information signal from said erasable recording means and applying each reproduced signal to said visual monitor means for displaying the information defined by said signal.

5. An information storage and reproduction system comprising:
   (a) master information storage means carrying recorded information,
   (b) first reading means mounted adjacent to said information storage means,
   (c) said first reading means adapted to read said recorded information,
   (d) means for relatively moving said master information storage means and said first reading means to permit said reading means to read different portions of said recorded information,
   (e) a plurality of monitor stations each including information storage means,
   (f) information selection means at said monitor station information storage means,
   (g) said first reading means controlled by said information selection means for reading selected information from said master station information storage means, and
   (h) master control means provided between said first reading means and said monitor stations for controlling the transmission of selected and different portions of information from said master information storage means to selected ones of said monitor stations.

6. An information storage and reproduction system comprising:
   (a) master information storage means carrying recorded information,
   (b) first electro-optical reading means mounted adjacent to said information storage means and positional to read said recorded information,
   (c) one of said master information storage means and said first reading means being controllably movable relative to the other so that said reading means can read different selectable portions of said recorded information, (d) a plurality of monitor stations each including further information storage means, (e) information selection means coupled to said monitor station information storage means, (f) second electro-optical reading means coupled to said information selection means for reading information selected thereby from said monitor station information storage means, and (g) master control means coupled between said first reading means and said monitor stations adapted to effect the transmission of selected and different portions of information from said information storage means to selected ones of said monitor means for storage and later reading at said monitor station.

7. An information storage and reproduction system including:

(a) an information storage medium carrying a plurality of groups of recorded information, (b) first electro-optical reading means mounted adjacent to said information storage medium and controllable to read all or selected portions of said recorded information, (c) means for relatively moving said information storage medium and said first reading means to permit said reading means to read different selectable portions of said groups of recorded information, (d) a plurality of monitor stations each including information storage means, information selection means coupled to said information storage means, (e) reading means coupled to said information selection means for reading information selected thereby, and (f) master control means coupled between said first reading means and said monitor stations adapted to control transmission of selected and different portions of information from said information storage medium to selected ones of said monitor means.

8. An information storage and reproduction system in accordance with claim 1, said information storage means of said monitor stations including hard copy producing means, said hard copy producing means being controllable to produce prints of selected information transmitted thereto from said reading means of said master information storage station.

9. An information storage and reproduction system in accordance with claim 5, including copy producing means provided at certain of said monitor stations and each operatively coupled to produce hard copy prints of selected information transmitted thereto from said master information storage station, and controlled means for said hard copy producing means operative to control copy reproduction.

10. An information system in accordance with claim 5, including copy producing means at said monitor stations each operatively coupled to the information storage means of the station and operative to produce prints of selected information transmitted thereto from said master information storage means, control means for said copy producing means, and means generating control signals accompanying the signals generated by said reading means and using said control signals to activate the control means of the stations to which said information signals are transmitted for producing copies of the selected information transmitted thereto.

11. An information storage and reproduction system comprising in combination:

(a) conveying means containing a plurality of image frames arranged in a tandem array, (b) means for guiding and moving said conveying means in a fixed path, (c) scanning means adapted for scanning said conveying means, (d) an image field generating means operatively connected to said scanning means, and having storage means energizable by said scanning means for generating an image field, (e) an image copy recording member, (f) a copy producing apparatus including servo means for moving said copy recording member through the field of said image field generating means, control means for said servo means, (g) selection control means for causing the modulation of said image field generating means by means of selected image information derived when said scanning means scans selected of said plurality of image frames, (h) said selection control means being operatively connected to said servo of said copy recording member for controlling operation of said servo in a manner whereby said copy recording member is moved through the field of said image field generating means to provide a new section of said copy recording member in said field for recording further information thereon.

12. An information storage and reproduction system comprising in combination:

(a) a conveying means containing a plurality of image frames arranged in a tandem array, (b) means for guiding and moving said conveying means in a fixed path, (c) scanning means adapted for scanning said conveying means, (d) an image field generating means operatively connected to said scanning means, and including a storage means energizable by said scanning means to generate image fields of the scanned image frames, (e) an image copy recording member and means for positioning said recording member to become exposed to image information as generated on said image field generating means, (f) a copy producing apparatus including servo means for moving said copy recording member through said image field, control means for said servo means, (g) selective control means for selectively modulating said image field generating means to generate an image field from information derived when said scanning means scans selected of said plurality of image frames, (h) said control means including a plurality of code-bearing cards, and a reading means for the codes on said cards, (i) means for operating said reading means in a manner to generate coded command signals from said codes on said cards, and (j) means for employing said command signals in sequence to effect the energization of said control means for said servo in a manner to control the movement of said image copy recording member and the activation of said scanning means to scan selected frames of information and to modulate said image storage means with selected image information.

13. An information storage and reproduction system comprising in combination with a multi-track conveying means for a plurality of document recordings, said recordings occupying predetermined tandem areas of a plurality of parallel tracks of said conveying means and defining lateral rows of document recordings, means for scanning said document recordings comprising a plurality of video transducers each of which is operatively positioned for scanning a respective track of said document recordings and is operative for providing picture signals on the outputs of said scanning means as generated in scanning said recordings, a plurality of monitor stations, storage means for picture signals at each monitor station, switching means operative to connect the outputs of a selected of said video transducers with selected storage means of said monitor stations, control means at each monitor station operative to activate said switching means to operatively connect the input to the storage means of the monitor station with a selected video transducer and including gating means operative to provide picture signals on a connected circuit to the storage means of a monitor station and control document recording selection, said control means for each monitor station adapted for activating said gating means to provide picture signals on the connected circuit generated in scanning selected recordings.

14. Apparatus in accordance with claim 13, each of said video scanners being operatively positioned relative to said document recording conveying means such that the leading edges of all document recordings approaching each video transducer will simultaneously be presented to each transducer, and means for generating at least one signal for identifying each row of said document recordings as said conveying means moves past said transducing means, means for transmitting said identifying signal to each monitor station, said control means for each monitor station being operative in response to said row-identifying signals for gating selected picture signals on the connected circuit.

15. An information storage and reproduction system comprising in combination with a conveying means for a plurality of document recordings, said recordings occupying predetermined tandem areas of a plurality of parallel recording tracks on said conveying means and defining lateral rows of said recordings, means for moving said conveying means in a path parallel to said tracks of document recordings, means for scanning said document recordings comprising a plurality of video transducers each of which is operatively positioned for scanning a respective of said parallel columns of document recordings, there being at least one transducer positioned for scanning each of said tracks, said transducers each operative for providing picture signals on the outputs of said scanning means generated in scanning said recordings, a plurality of monitor stations, means for storing a plurality of picture signals at each monitor station, switching means operative to connect the output of a selected of said scanning means with a selected of said storage means of said monitor stations, first selection means for each monitor station adapted, when operated to activate said switching means, to operatively connect the input to the storage means of the monitor station with a selected scanning means, gating means operative to pass picture signals on a connected circuit to the storage means of a monitor station and to control document recording selection, control means for each monitor station adapted for activating said gating means to provide picture signals on the connected circuit generated in scanning selected recordings, and second selection means at each monitor station operative to effect the selective reproduction of picture signals from the monitor station storage means and to effect transducing of said signals to visible images.

16. An information storage and reproduction system comprising in combination, a plurality of document recordings provided as separate groups of recordings, a plurality of video scanners adapted for scanning individual recordings, conveying means for said recordings operative for presenting individual recordings of each group in the scanning field of a respective scanner whereby the recordings of each group may be individually scanned, an output means for each scanner on which picture signals derived from scanning said recordings are generated, a plurality of monitor stations, monitor means at each station including storage means for picture signals and image generating means operatively connected to said storage means, a communication system including a plurality of communication channels, switching means operative to connect the output of a selected of said video scanners with a storage means of a selected monitor station, a first control means at each monitor station including a selection means adapted when operated to activate said switching means to operatively couple the monitor station with a selected scanning means along one of said communication channels for scanning recordings of a selected group, a plurality of gating means including at least one switch for each monitor station operative to pass picture signals to the storage means thereof from a scanner connected thereto, control means at each monitor station for activating said gating means for passing picture signals generated in scanning selected recordings to said picture signal storage means and providing selected images on said image generating means.

17. Recording and reproduction apparatus comprising in combination:
 (a) a first endless track record bearing member having a plurality of optically scannable information recordings provided on a first record track area thereof,
 (b) electro-optical means for scanning said recordings mounted off said record member,
 (c) a second recording member having an endless track erasable recording area,
 (d) means for simultaneously driving said second and first recording members in substantially predetermined paths,
 (e) said electro-optical scanning means being operatively coupled to scan said first recording member and to transduce signals derived therefrom onto said erasable recording member,
 (f) selective control means for effecting the transducing of only predetermined information recordings from said first record-bearing member to said second recording member,
 (g) pick-up means operatively coupled to scan said second recording member and to transduce recordings thereon to electrical signals, and
 (h) a further transducing means operatively coupled to said recording member pick-up means for converting said electrical signals to a monitorable form.

18. Recording and reproduction apparatus in accordance with claim 17, in which said selective control means comprises a code-matching relay adapted to generate an output signal upon being energized for controlling the transducing of selected information from said first record-bearing member to said erasable recording member, a plurality of codes recorded on a further track of said first record-bearing member adjacent said information recordings and including at least one code for identifying each information recording, reproduction means for said codes operatively connected to said code matching relay, a selection code generating means operatively connected to said code-matching relay including means for generating predetermined selection codes each of which is operative to energize said relay when a similar code is generated by said reproduction means for said recorded codes whereby the selected information recording, which is scanned by said electro-optical means when said relay is energized, is transduced and recorded on said erasable recording member.

19. An information storage and reproduction system comprising in combination:
 (a) a conveyor having provided thereon a plurality of image fields arranged in a tandem array and adapted to be moved by said conveyor in a predetermined path,
 (b) means for scanning said image fields,
 (c) said scanning means comprising a plurality of video scanners each having a respective output and adapted to produce on its output a picture signal of each of said image fields scanned thereby,
 (d) a plurality of monitor stations, switching means having a plurality of inputs which are adapted to receive picture signals generated by a selected of said video scanners, control means for said switching means and operative for connecting the output of a selected scanning means with a selected monitor station, (e) picture signal selection means for each of said monitor stations adapted when operated to gate through said switching means picture signals derived when said scanning means scans selected of said image fields, (f) storage means at each of said monitor stations adapted to receive and store plural picture signals gated thereto from said scanning means, and (g) video display means at each of said monitor stations adapted to convert picture signals received from said scanning means into a visual image on a viewing screen thereof.

20. An information storage and reproduction system comprising in combination:

(a) a conveyor for a plurality of image fields, means for moving said conveyor intermittently along a fixed path, (b) a video scanning means positioned with respect to said conveyor for scanning predetermined image fields thereof, (c) said image fields being provided on said conveyor in a tandem array and being so spaced that each will be essentially centered in the scanning field of said scanning means during the intermittent stoppage of said conveyor, (d) the dwell period of said intermittent conveyor motion being substantially equal to the time said video scanning means takes to completely scan an image field while said conveyor is stopped and to permit said scanning means to generate a picture signal on an output thereof which picture signal is a modulated electrical signal representative of the image field scanned, (e) a plurality of monitor stations, (f) a plurality of communication channels and switching means for selectively connecting said monitor stations and said scanning means, (g) each of said monitor stations having a signal input which is operatively connectable to said output of said scanning means through switching means, (h) selection means for each of said monitor stations operative to gate through said switching means video signals derived when said scanning means scans selected of said image fields, (i) storage means at each of said monitor stations adapted to receive and store picture signals information transmitted thereto from said scanning means, (j) and display means at each of said monitor stations adapted to convert a picture signal received from said scanning means into a visual image field on a viewing screen thereof.

21. An information storage and reproduction system comprising in combination:

(a) an endless track conveyor having a plurality of tracks of image frame information provided thereon which frame information is scannable from at least one side of said conveyor, (b) said image frame information being arranged as a plurality of rows of frames extending across said conveyor, (c) a plurality of video scanners arranged in a lateral row extending across said conveyor with each scanner of said row positioned whereby a respective of said tracks will pass through the scanning field of said scanner, (d) automatically operative means for intermittently moving said conveyor in a manner whereby when said conveyor is stopped, respective frames of a row are each aligned in the scanning field of a respective of said scanners and each frame remains in scanning relationship with its scanner for a sufficient period of time to permit the scanning means to scan said respective fields and to each produce a respective picture signal on the outputs of said cameras, (e) a switching system, (f) a plurality of monitor stations each having signal input means operatively connectable to the output of one of said scanners through said switching system, (g) selection means for each of said monitor stations operative to gate thereto through said switching system picture signals derived from a selected of said scanners generated in scanning selected of the image frames passing through its scanning field.

22. An information storage and reproduction system comprising in combination:

(a) image field scanning means, conveying means for a plurality of different image field recordings arranged in a tandem array and adapted to be moved by said conveying means in a predetermined path relative to said scanning means, (b) said scanning means being operative for producing on an output thereof a picture signal of each of said image fields scanned thereby, (c) a plurality of monitor stations each having a signal input which is operatively connectable to said output of said scanning means, switching means operatively connecting said communication channels and said monitor stations, (d) selection means for each of said monitor stations operative to gate through said switching means video signals derived when said scanning means scans selected of said image fields, (e) storage means including a recording apparatus at each of said monitor stations adapted to receive and record plural picture signals gated thereto from said scanning means, video image generating means at said monitor stations, (f) selection means at said monitor stations for selectively reproducing said picture information recorded in said storage means and for presenting said information at the input of said video image generating means and means for converting said information to a video image field.

23. An information storage and reproduction system comprising in combination:

(a) a conveyor including an elongated member having a plurality of tandem arrays of image fields provided thereon which are visible from at least one side of said elongated member, (b) said arrays of image fields being arranged in a plurality of parallelly extending tracks with the image fields of adjacent tracks arranged in a plurality of lateral rows which are parallel to each other, (c) a plurality of video scanners mounted off said conveyor, each adapted to scan a respective of said columns of image fields and to provide picture signals on respective outputs of said scanners of respective of said image fields when said fields are in the scanning fields of said video scanners, (d) a plurality of monitor stations each having a signal input and switching means for connecting said input to receive picture signals generated by any one of said video scanners, (e) selection means for each of said monitor stations for operating said switching means to gate video signals derived when said scanning means scans selected of said image fields to said video scanners, (f) erasable storage means at each of said monitor stations for receiving and storing a plurality of picture signals gated thereto from said scanning means, and (g) display means at each of said monitor stations including means for converting a picture signal derived from said storage means into a visual image field on a viewing screen thereof.

24. An information storage and reproduction system comprising in combination:
   (a) conveying means for a plurality of image frames arranged thereon as a plurality of tracks, a plurality of video scanners arranged in a row across said plurality of tracks,
   (b) said image frames each occupying substantially the same area and being provided on said conveying means in a plurality of parallelly extending tracks with the frames of each column aligned in adjacent columns which extend in substantially parallel rows across said conveying means with the frames of each row adapted to simultaneously enter and leave the scanning fields of said row of scanners,
   (c) said conveying means having a position-indicating code track provided on a longitudinal strip area thereof,
   (d) means for reading said code track as said conveyor moves and for providing said code as an electrical signal on an output of said reading means,
   (e) said code track being divided into tandemly arranged code units each of which units, when reproduced by said reading means, is indicative that a particular row of said image frames is in the scanning fields of said row of said scanners,
   (f) a plurality of monitor stations and a switching system, each of said monitor stations having a signal input which is operatively connectable to the output of any of said scanners through said switching system,
   (g) image frame reproduction selection means for each of said monitor stations and operative to pass to its monitor station picture signals derived from a selected of said scanners as it scans selected of the image frames passing through its scanning field, a code matching relay means having input means connected to said means for reading said codes,
   (h) said selection means including a switching means for operatively connecting the output line of a selected of said scanners with a line to any of said monitor stations,
   (i) means for adjusting said code matching relay to cause it to become energized when a predetermined code is present on its input means from said code reading means,
   (j) said code-matching relay including normally open switching means for gating the picture signal output of said selected scanner to a storage means at said connected monitor station for a predetermined period of time after said code matching relay becomes energized.

25. An information storage and reproduction system in accordance with claim 24, each of said monitor stations having a bi-stable switch in its input line for gating selected picture signals from the output of said selected video scanner to a storage means therefore, said code-matching relay means comprising a pair of code matching relays each of which is operative to receive the electrical code produced by said code reading means, a first of said code matching relays operative when it becomes energized to close said bi-stable switch, the other of said relays being operative to open said bi-stable switch, and means for presetting said code-matching relays to close and open said bi-stable switch in a manner whereby only selected picture signals produced by said selected scanner will be gated to said storage means through said switch.

26. An information storage and reproduction system in accordance with claim 25, including movement means for said conveyor comprising an intermittent drive operative to position each row of said image frames while stopped adjacent a row of scanners whereby each frame of said row is centered in the scanning field of the scanner scanning the track thereof, said video scanners having beam scanning means and control means therefore for controlling the movement of its scanning beam in reading said image field in a predetermined path across said field and providing on an output of said scanner a modulated picture signal, means synchronized to the movement of said conveyor for providing an electrical trigger signal each time said conveyor comes to rest, a trigger input to said beam controlling means adapted when energized to effect the controlled movement of said reading beam in scanning said complete image field, said trigger signal producing means being connected to said trigger input of said beam controlling means whereby each time said conveyor positions a new row of frames in the scanning field of said row of scanners the scanning beams of said cameras will scan said fields, said intermittent motion of said conveyor being such that a frame will remain in the scanning field of a respective camera for a time interval sufficient for the scanning beams of all cameras to simultaneously effect complete screen sweep of their respective fields and provide picture signals thereof on their outputs.

27. An information storage and reproduction system comprising in combination:
   (a) a conveyor for a plurality of image frames including means for automatically moving said conveyor in a fixed path relative to plural rows of video scanning cameras,
   (b) each of said image frames occupying substantially the same area and being provided on said conveyor in a plurality of parallelly extending tracks with frames of adjacent tracks aligned in rows and extending as a plurality of substantially parallel rows across said conveyor whereby the frames of each row simultaneously enter and leave the scanning fields of respective of said cameras,
   (c) said cameras in each row being positionally staggered relative said conveyor whereby a camera in one row scans a particular column of said frames and the column adjacent thereto is scanned by a camera in another row of said cameras such that the spacing of said columns may be closer than the separation of the scanning fields of two adjacent cameras when their housings are in touch with each other,
   (d) means for scanning said columns of image information and providing picture signals of said scanning on the outputs of said cameras.

28. Information storage and reproduction apparatus comprising in combination:
   (a) transport means for an elongated flat record-bearing member containing a plurality of record tracks defined as separate rows of first image frames extending longitudinally along said record-bearing member and parallel to each other,
   (b) means for monitoring information contained on said flat record member including:
      (i) electro-optical means for scanning selected or said image frames, and
      (ii) visual monitor means in operative relation with said electro-optical means and including a visual presentation means having an image screen,
   (c) means for operating said electro-optical means to scan a first track of said record member,
   (d) frame selection means for selectively presenting enlarged still images representative of selected of the images of said first image frames, one at a time on said screen,
   (e) means operative to control the relative movement of said electro-optical means and said transport means for said elongated flat record-bearing member to permit the scanning of selected image frames of said record-bearing member by said electro-optical means,
   (f) a first manual control means connected to said frame selection means for effecting the scanning of a selected row of image frames, second control means operative to cause the transmission of information generated in scanning a selected image frame of a selected row of said record-bearing member and the generation of a still image of said selected frame on said screen for the visual monitoring thereof, (g) said first and second selection control means each being variably selectively operative to effect the scanning of selected others of said rows of image frames and the generation of images of selected frames in said rows on said screen in any order depending on how both said selection control means are operated.

29. An information storage and reproduction apparatus in accordance with claim 28, wherein said record-bearing member is a flat sheet-like member containing a plurality of tandem arrays of image frames arranged in substantially parallel lateral rows, each comprising one frame of each longitudinal row and means for automatically predeterminately locating each lateral row of said frames with respect to said electro-optical means while scanning a selected longitudinal row thereof whereby predetermined individual frames of each longitudinal row may be selectively scanned and monitored.

30. An apparatus in accordance with claim 29, whereby frame marker means are recorded on said recording member and are indicative of the locations of respective lateral rows of said frames and means for selectively scanning said marker means, frame selection control means operatively connected to said marker scanning means for causing the scanning of a selected frame of a selected longitudinal row of frames and the production of an image thereof on said visual presentation means.

31. An apparatus in accordance with claim 30, said marker means comprising a plurality of binary codes including at least one code associated with and predeterminately located relative to each recorded video picture signal.

32. An information storage and reproduction system comprising:
(a) master information storage means carrying recorded information defined as a plurality of discrete document recordings,
(b) first reading means for reading said document recordings,
(c) monitor means including viewing means communicating with the output of said first reading means,
(d) first control means at said monitor means,
(e) second control means selectively operable for causing selected information to be read and transmitted from said storage means to said monitor means,
(f) a plurality of record members containing coded information for retrieving information from said master information storage means,
(g) said first control means including means for removably receiving a record member and reading said coded information from said record member,
(h) means for operatively connecting the output of said reading means of said first control means to said record control means for selectively operating said second control means to transmit selected information to said monitor means,
(i) said monitor means including a viewing screen modulatable by information received from said first reading means to permit the viewing of document information as selected by coded information generated in reading selected record members.

33. A system in accordance with claim 31, said record members comprising a plurality of record cards, said first control means including a card reader, and means for generating coded electrical signals representative of selected information sought from said master information storage means, said second control means being responsive to said coded signals and operative upon receiving a coded signal to effect the transmission of predetermined document information from said first reading means to said monitor means.

34. A system in accordance with claim 33, said second control means including comparator means and identifying code means associated with said document recordings of said master information storage means including at least one discrete code associated with each recording, means for reading said document code recording and transmitting same to said comparator means, said comparator means being operative to receive a selection code generated by said reading means of said first control means and to generate a control signal when the code received from said means reading said document code recordings and said means reading said coded information on a selected record member are the same, and means responsive to said control signal for controlling selected information to modulate said monitor means.

35. An information storage and reproduction system comprising:
(a) conveying means for image information including an elongated flat record-carrying member having a plurality of parallel record tracks each containing a tandem array of different image frames,
(b) means for guiding and moving said conveying means in a fixed path,
(c) a scanning system including scanning means for selectively scanning each row of image frames and
(d) image field generating means including a screen in operative relation with said scanning means for monitoring scanned information,
(e) means for generating the images of a selected row of scanned image frames on said screen,
(f) a hard copy producing means including means for positioning an image copy recording member in operative relation with said image field generating means and means for generating an image in said recording member concurrently with the image generated on said screen, and
(g) control means for selectively operating said hard copy producing means and said scanning means to generate selected images on said screen and to produce hard copy recordings in said recording member of selected of the images so generated.

References Cited

UNITED STATES PATENTS

| | | | |
|---|---|---|---|
| 2,721,990 | 10/1955 | McNaney | 340—149 |
| 2,871,287 | 1/1959 | Harter. | |
| 2,923,921 | 2/1960 | Shapin. | |
| 3,050,579 | 8/1962 | Nash | 178—5.6 |

ROBERT L. GRIFFIN, Primary Examiner

H. W. BRITTON, Assistant Examiner

U.S. Cl. X.R.

178—6.6